United States Patent
Sprigg et al.

(10) Patent No.: US 9,734,386 B2
(45) Date of Patent: Aug. 15, 2017

(54) METHODS, SYSTEMS AND DEVICES FOR ELECTRONIC NOTARY WITH SIGNATURE AND BIOMETRIC IDENTIFIER

(71) Applicant: QUALCOMM Incorporated, San Diego, CA (US)

(72) Inventors: Stephen Alton Sprigg, Poway, CA (US); Jason Borthwick Kenagy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 14/485,590

(22) Filed: Sep. 12, 2014

(65) Prior Publication Data

US 2016/0078277 A1    Mar. 17, 2016

(51) Int. Cl.
    *G06K 9/00*    (2006.01)
    *G06K 9/22*    (2006.01)
    *G06F 3/0354*   (2013.01)

(52) U.S. Cl.
    CPC ..... *G06K 9/00181* (2013.01); *G06K 9/00154* (2013.01); *G06K 9/00174* (2013.01); *G06K 9/00892* (2013.01); *G06K 9/00899* (2013.01); *G06K 9/22* (2013.01); *G06F 3/03545* (2013.01)

(58) Field of Classification Search
    CPC .......... G06K 9/00174; G06K 9/00181; G06K 9/00899
    USPC ....................................................... 382/119
    See application file for complete search history.

(56) References Cited

U.S. PATENT DOCUMENTS

| | | | |
|---|---|---|---|
| 5,909,500 A * | 6/1999 | Moore ................ | G07C 9/0015 382/123 |
| 6,828,960 B2 | 12/2004 | Parry | |
| 7,433,499 B2 | 10/2008 | Kim | |
| 2003/0212893 A1* | 11/2003 | Hind ..................... | H04L 9/3236 713/177 |
| 2006/0104483 A1 | 5/2006 | Harel et al. | |
| 2006/0161789 A1* | 7/2006 | Doughty .............. | G06Q 20/327 713/186 |

(Continued)

FOREIGN PATENT DOCUMENTS

| WO | 0122351 A1 | 3/2001 |
| WO | 0143058 A1 | 6/2001 |
| WO | 2007034255 A1 | 3/2007 |

OTHER PUBLICATIONS

International Search Report and Written Opinion—PCT/US2015/042814—ISA/EPO—Oct. 21, 2015.

(Continued)

*Primary Examiner* — Manuchehr Rahmjoo
(74) *Attorney, Agent, or Firm* — The Marbury Law Group

(57) ABSTRACT

A method, system and device are provided for authenticating a signature made by a signer. When the signer is making the signature a biometric quantity associated with the signer may be sampled. The sampling generates a sequence of biometric samples of the biometric quantity. Continuity of generated sequence of biometric samples of the biometric quantity is validated. Each of the biometric samples of the biometric quantity in the generated sequence is validated. The signature of the signer may be authenticated when the generated sequence of biometric samples is validated, and a continuity of the biometric samples is validated.

28 Claims, 12 Drawing Sheets

(56) References Cited

U.S. PATENT DOCUMENTS

| | | |
|---|---|---|
| 2006/0215886 A1* | 9/2006 | Black .................. G06K 9/0002 382/124 |
| 2007/0242852 A1 | 10/2007 | Kumoluyi |
| 2009/0235082 A1 | 9/2009 | Garrett |
| 2010/0058063 A1 | 3/2010 | Tuyls et al. |
| 2012/0212459 A1* | 8/2012 | Rusu .................. G06F 3/03545 345/179 |
| 2012/0331566 A1 | 12/2012 | Lection et al. |
| 2013/0083208 A1 | 4/2013 | Koh |
| 2014/0023246 A1 | 1/2014 | Bolding et al. |
| 2015/0310255 A1* | 10/2015 | Ivascu .................. G06K 9/00174 345/174 |

OTHER PUBLICATIONS

Solami E A., et al., "Continuous Biometric Authentication: Can It Be More Practical?", High Performance Computing and Communications (HPCC), 2010 12th International Conference on, IEEE, Piscataway, NJ, USA, Sep. 1, 2010 (Sep. 1, 2010) pp. 647-652, XP031932143, DOI: 10.1109/HPCC.2010.65 ISBN: 978-1-4244-8335-8 the whole document.

* cited by examiner

METHODS, SYSTEMS AND DEVICES FOR ELECTRONIC NOTARY WITH SIGNATURE AND BIOMETRIC IDENTIFIER

BACKGROUND

Verification of a written signature for generally entails the use of a notary to authenticate the identity of a person signing a specific document, witnessing the signing of the document to authenticate the signature, and providing a certification of the authentication that may be presented as legal evidence of the authentication process. Verification of a written signature and in particular, the identity of the person signing a document, is important to validate that the person actually signing the document and purporting to be the person required to sign the document, is the correct person. Further, the notary may testify regarding the signing in order to provide evidence that supports a visual verification that the person who signed the document was the correct person, or at least was a person having identification purporting to be that of the correct person.

Notaries have disadvantages in that a person who signs a document in the presence of a notary may use fraudulent identification to support their purported identity. Also, in many business transactions a notary may not be available. Further, because notary services involve costs, the use of a notary may be limited to only the most sensitive documents. However, by not using a notary there is a risk that an unauthenticated signature may be fraudulent.

Some electronic systems have been developed in an attempt to validate signatures and identities; however, all have drawbacks. For example, systems that use a biometric sensor may take a reading and "validate" an identity based on the biometric, which can be spoofed. Once an identity is "validated" using a spoofed biometric value, the person spoofing the biometric—or someone else—may proceed to sign a document. Other systems collect information from an electronic pen; however, such systems typically generate a signature data file that may also be spoofed. For example, the signature data file of the correct person may be stolen or surreptitiously obtained and used by another to "validate" a forged signature.

SUMMARY

In the various embodiments, an embodiment method for authenticating a signature made by a signer may include validating the signature made by the signer using biometric information gathered continuously while the signer is making the signature. While the signer is making the signature, biometric quantity associated with the signer may be sampled. The sampling may generate a sequence of biometric samples of the biometric quantity. A continuity of the generated sequence of biometric samples of the biometric quantity may be validated. Each biometric sample in the generated sequence of biometric samples of the biometric quantity may be validated. An embodiment method may further include authenticating the signature of the signer when the generated sequence of biometric samples is validated, and when the continuity of the sequence of biometric samples is validated.

An embodiment method may further include failing to authenticate the signature of the signer when at least one of the following occurs when the generated sequence of biometric samples is not validated, and when continuity of the sequence of biometric samples is not validated.

In an embodiment method, the signature made by the signer while the signer is making the signature may be validated by continuously sampling the signature while the signer is making the signature to generate a sequence of signature samples, and validating each of the signature samples generated during the continuously sampling of the signature.

In an embodiment method, sampling the biometric quantity associated with the signer may include taking a first biometric sample during a first sampling interval to generate a first one of the sequence of biometric samples and taking a second biometric sample during a second sampling interval immediately following the first sampling interval to generate a second one of the sequence of biometric samples.

In an embodiment method, validating the continuity of the generated sequence of biometric samples of the biometric quantity may include detecting whether an interruption has occurred between any two biometric samples in the generated sequence of biometric samples, validating the continuity of each biometric sample in the generated sequence of biometric samples when no interruption is detected, and not validating the continuity of each biometric sample in the generated sequence of biometric samples when an interruption is detected.

In an embodiment method, detecting whether an interruption has occurred between any two biometric samples in the generated sequence of biometric samples may include detecting a condition indicating an interruption between any two biometric samples in the generated sequence of biometric samples, in which the condition indicating an interruption may be a sequence number condition, a correlation condition, and a code condition. In an embodiment method, detecting when the signer is making the signature by the signer may include detecting movement of one of: an ink pen, an electronic pen, a physical implement (e.g., a stylus, paint brush, wand, or conductor's baton); a body part, or a fingertip on a touch sensitive surface.

Various embodiments include a system that may include a biometric sensor and a processor for authenticating a signature made by a signer according to the embodiment methods described above. Various embodiments include an embodiment system for authenticating a signature made by a signer that means for performing operations of the embodiment methods described above. Various embodiments include non-transitory computer readable media storing processor-executable instruction configured to cause a processor to perform operations of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
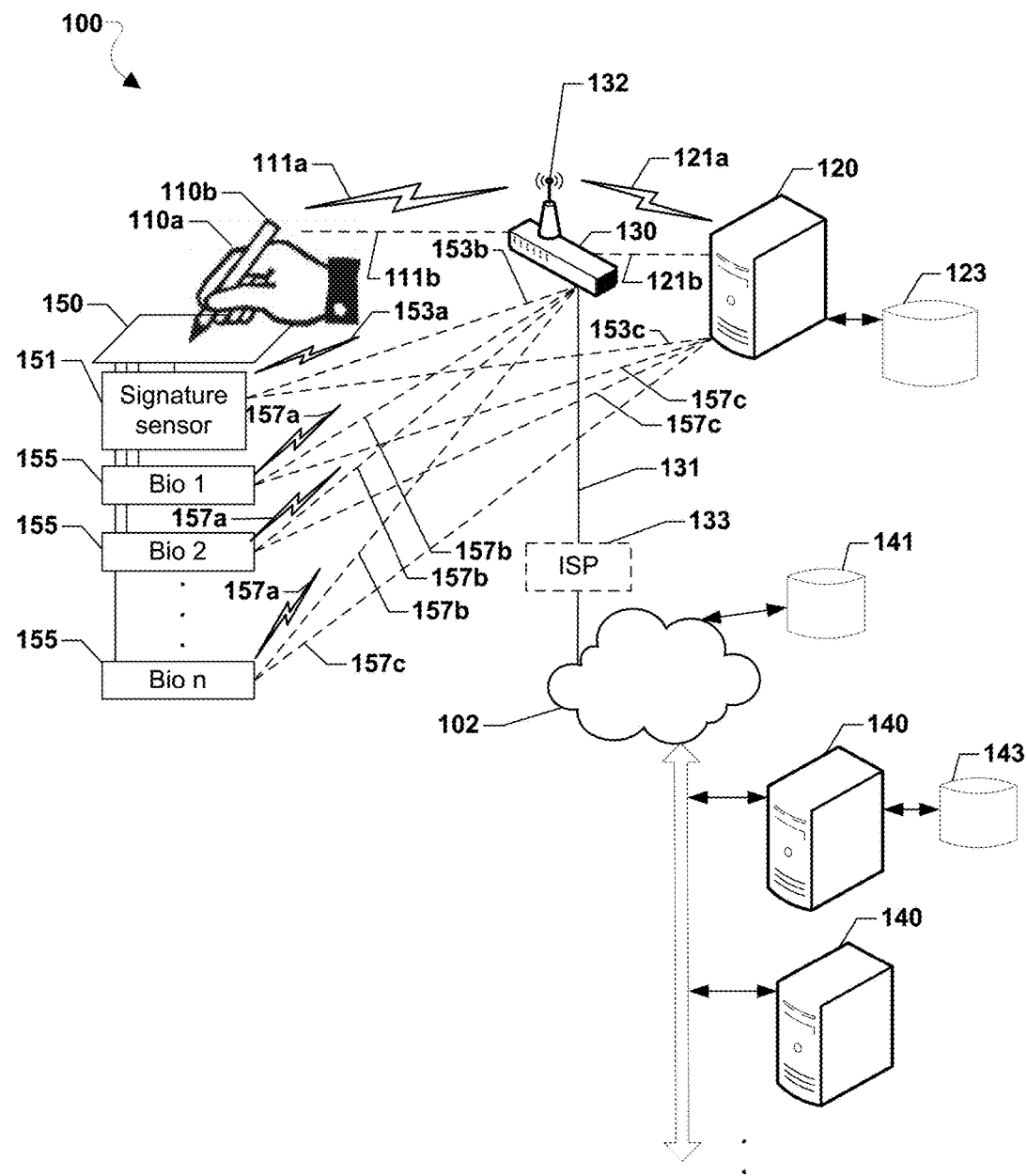
FIG. 1A is a system diagram illustrating components of an electronic notary and biometric sampling system suitable for use in the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide for an electronic alternative to a notary public, which may perform many notary services. A certification statement would ordinarily be provided by a notary, who may be a person with legal training or a lawyer who may be licensed by the state to perform notary functions. Notaries normally perform various ministerial acts in legal affairs, such as witnessing signatures on documents. A notary public may be a public official who notarizes legal documents and who can also administer and take oaths and affirmations, and other tasks. Specialized document signing agents may also be notaries. A signing agent, loan signing agent, may be a notary public who specializes in notarizing mortgage and real estate documents. Although notaries public may be officers of the court, or public officials, they are generally not paid a salary for their notary services. Notaries generally are paid by charging fees for each notarization act. Alternatively notaries may provide free services in connection with other employment, or provide pro-bono free services.

The definition of what it means to "notarize" a document or event may vary and may include authenticating, verifying, validating or otherwise confirming an identity of a signer and witness and authenticate, verify, validate, or otherwise confirm a signature made by a signer on a legally significant document. In some instances, the notary may check the propriety of the document itself, particularly when acting as an agent. However, the notary's primary function is to validate identities and witness signatures and to certify that they have done so.

To notarize generally means to perform various functions that may include in a non-exhaustive manner: to identify the person appearing before the notary by reference to significant proofs of evidence including passport, driver's license, birth certificate, diplomatic documents, or other forms of documentary proof; to verify, record and compare signatures against known standards; recording the proof of identity in a notary log or register; to confirm that the signer is of full age and legal capacity; to take and record an affidavit or declaration; to take detailed instructions associated with various legal bills, writs and other actions; to take an acknowledgment of execution of a document and preparing a certificate of acknowledgement; to prepare a notary certificate as to the signature or other action; to apply a seal or stamp, sign or otherwise certify the notarization in a section of the document; to record all notary activities in the notary log or register; to deliver the completed original to the signer or legally entitled party; to retain a copy of the document in the log or register. Any or all of the above action may involve charging the signer a fee for the service.

The various embodiments include devices, systems and methods for providing an electronic notary function that includes verifying the signer of a document using an uninterrupted and continuous sampling of a biometric associated with signer that is verified in order to verify the identity of a signer during the signing process. The various embodiments reduce opportunities for spoofing the verification process while the biometric samples by eliminating time windows during which intrusion or spoofing could be attempted. The continuous sampling and verification of the biometric and the signature also may help to prevent other spoofing or intrusion attempts. The various embodiments enable one or more biometrics to be continuously sampled while a signature is being made by a signer. In some embodiments, the continuous biometric samples may be authenticated as samples are obtained while the signer completes the signature. Because the biometrics are continuously sampled while the signer is making the signature (e.g., during the signing interval), any interruption in the continuity of the biometric or the signature may be detected. An interruption or discontinuity in the biometric sampling may indicate an attempt to spoof the identity of the signer or intrude on the verification of the signature making process.

In a typical signature process, a signer may make a signature using a pen on a paper, a stylus on a touch sensitive surface, a stylus/pen on a paper document that overlays a touch sensitive surface, a finger tip on a touch sensitive surface, or some combination of these approaches or other approaches. In some embodiments, methods and systems may be configured to enable the signer to make a signature using a gesture with a physical implement (e.g., a stylus, paint brush, wand, or conductor's baton), a finger tip, a hand, or another body part or prosthetic body part. In such embodiments, a signature may be made in connection with a virtual signing environment, such as in a virtual or augmented reality system in which signing could be done in open space (i.e., not on a physical surface or screen) and continuous biometrics monitoring/processing may be performed throughout the gesturing movements. During the signing process, the signer may make a single, linked movement for the entire signature, or a series of linked movements for a first name, a last name or for different characteristic portions of the signature. Such linked movements and portions, once established generally remain the same for the signer, although signatures may evolve slowly over time. Such established linked movement and characteristic portions may be referred to as a "signing style" of the signer. It is also possible that the signer may deviate from the normal characteristic signing style from time to time based on preference, circumstances, importance of the signature, stress, etc. The signature is generally completed within a signature interval.

In the various embodiments, the signature may be verified during the signing process, such as during the signature interval by analyzing the signing style of the signature and comparing it with known signing styles of the person the signer is purporting to be. Various analysis techniques may be used to verify a signature, such as pen or finger stroke analysis, movement analysis (particularly for gesture signatures) pressure analysis, speed analysis, acceleration analysis, and image analysis, with such analysis completed while the signature is being made, after the signature is completed, or a combination of during and after the making of the signature. Combining signature analysis with continuous biometric sampling and validation allows continuous signature validation and forecloses spoofing opportunities. The various embodiments may ensure that, simultaneously with the signature being made, a signer having a correct biometric (i.e., a biometric that matches a known biometric of the person whose identity the signer is purporting to possess), which is continuously sampled and validated during the signing process, is actually making the signature.

As used herein, the term "signatory," "signer," or "user" may refer to a person providing a signature in association with a document, which may refer to a paper document, an electronic document, or other type of document or a combination thereof. For example, a signer may make a signature using a pen on a paper document that rests on a pressure sensitive tablet, which may also generate electronic data associated with the signature. A signer may use an electronic pen, or may use a stylus or a fingertip on a touch sensitive surface. A signature may generally be a characteristic marking of a document, or representative document (e.g., electronic document), made by a person, that indicates a legal acknowledgement by the signer or provider of the signature of some aspect of the document. For example, a document may be a contract, a certification, a title transfer, a deed or similar legal document. The signer may purport to be a particular person, the identity of which the electronic notary system is authenticating and for which an authenticated legal signature is required. If a fraud is being committed, a signer of the document may be someone other than who the signer is purporting to be (i.e., the person whose signature is to appear on the document).

The term "validate," "validating," "validation," and terms deriving from these terms, is used herein to refer to an action or determination of a validity of a thing, such as a signature. For example, the terms validate, validating, validation may refer to an action or completed action associated with a successful authentication of samples, a confirmation of sample continuity, and other information (e.g., signer identity), which, when considered together, leads to a conclusion of validity for the signature. Validating and a validation may also refer to a certification, message, seal, or other indication of validity that is provided with or applied to a document that has been validated.

The term "authenticate," "authenticating," "authentication," and terms deriving from these terms, is used herein to refer to an action or determination of an authenticity of a thing, such as a signature sample or biometric sample. In some embodiments, a stored sample that is known to be authentic or genuine (i.e., is known to be associated with a signer) may be compared with a captured sample of the same quantity (e.g., signature sample, biometric sample, etc.). In one example of authentication, when a comparison between the stored biometric sample and a captured biometric sample indicates a match, the captured biometric sample may be "authenticated."

The term "verify," "verifying," "verification," and terms deriving from these terms, is used herein to refer to an action or determination of a verity, or truth of a thing, such as a signature. For example, verification of a signature may be a determination that the elements associated with the signature are truthful and that legal reliance on the signature is justified. For example, verification may include a certification that, upon a preponderance of evidence the truth, e.g. that the signer is who they purport to be, that the signer actually made the sampled signature, that the signature was actually made on or in association with the appropriate document, and so on.

As used herein, the term "biometric" may refer to measurable physical quantities that may possess certain characteristics. Non-limiting examples of biometrics include fingerprints, iris configurations, facial configurations, retinal configurations, venous or vascular configurations, patterns of hand motion and acceleration, pen motion patterns, acceleration and pressure, voice signature, skin conductance, heart rate, DNA, and combinations of the foregoing. For example, changes in a biometric over a period of time may provide further identifying characteristics. The characteristics of a measured biometric or a combination of biometrics, or change characteristics in a measured biometric or combination of biometrics over time, may be used to uniquely identify individuals.

As used herein, the term "sampling" may refer to the capture or measurement of a biometric quantity at a given instant, such as a particular measurement in a string of measurements or data obtained within a short sampling window of measurement values or signals streaming from a biometric sensor. Generally, a sequence of samples may be captured over time by a sampling device or biometric sensor. Sampling times may vary widely from depending upon the type of biometric sensor and the time required to obtain each biometric measurement (e.g., a scan time). A sampling circuit or device may be a stand-alone sensor, a discrete device incorporated into a computing device, or incorporated into a chip or other device embedded in the stand-alone sensor or the computing device. Because sampling necessarily involves a finite time interval to capture a sample, biometric samples may be separated by a sampling interval, which is used herein to refer to the time between samples.

As used herein, the term "continuous" such as in connection with "continuous sampling" may refer to uninterrupted. For example, continuous sampling may refer to sampling (e.g., of a biometric) without interruption or significant interruption. Because digital sensors necessarily involve the generation of discrete measurements or samples at a sampling interval, some discontinuity in the monitoring of a biometric quantity may be present between samples. Thus, continuous samples by a biometric sensor that obtains individual samples at a sampling interval refers a sequence of samples without a gap longer that the sampling interval. Because digital biometric sensors may have a short sampling interval (e.g., milliseconds, microseconds, etc.) the brief time between samples may provide insufficient opportunity for spoofing or intrusion.

Interruption or significant interruption of samples may refer to a pause, gap or cessation of sampling having a length of time sufficient to present an opportunity for spoofing or intrusion, such as substitution of an actual sample or samples with a spoofed sample or samples. Further, continuous sampling may refer to the verification of the continuity of samples, such as by analyzing the rate of change from one sample to the next as provided in some embodiments or from anomalies in the sourcing or format of the samples that deviate from the established format or source, the expected format or source, or that deviate from the source or format of previous samples.

As used herein, the term "signature interval" may refer to a period of time during which the signature is executed. For example, the start of a signature interval may be when a pen touches the paper or another similar event that can be detected and correlated to the start of a signature. Additionally or alternatively, the start of the signature interval may depend on the successful acquisition of one or more biometric quantity or quantities. The acquired biometric(s) may also be authenticated as a pre-condition of starting the signature interval. Alternatively, the start of a signature interval may be designated by the system based upon a state of readiness of the system (e.g. begin continuous biometric sampling), or a combination of event detection and interval start designation. For example, the system may designate a point in time when the signer may begin to make the signature and then detect when the making of the signature has begun. The designated start time may include a time that is set based upon successful acquisition of one or more biometrics.

The end of the signature interval may be when the signer lifts the pen from the paper, puts the pen down, stops moving the pen for a predetermined interval, or other similar event that may be detected and interpreted as indicating that the signature is finished. Alternatively, or in addition to, the end of the signature interval may be designated by the system, taking into account timing factors, such as the average maximum length of a typical signature making process. The end of the signature interval may further be designated by the system. The end of the signature interval may further depend on the cessation of biometric acquisition. For example, the end of the signature interval may be established when a signer lifts a finger away from a biometric sensor, such as a fingerprint sensor. Further, the end of the signature interval may be established when an event occurs, such as pressing a physical or virtual button, tapping or double clicking a touch screen, or similar action by the signer. An end of signature action, such as pressing an "accept" button, may be used as a certification statement by the user that they have made the signature or have completed making the signature, that the signature is theirs, and that they are who they purport to be.

The various embodiments may be implemented within a variety of environments, such as private networks, public networks, or combinations of private and public networks. Because the signature and biometrics may represent sensitive personal and private information and may provide access to important information, security measures may be important.

An example network 100 for obtaining and verifying a signature according to various embodiments is illustrated in FIG. 1A. In an embodiment, the network 100 may include a signature device 150, such as a mobile communication device (e.g., smartphone, tablet, etc.) with a signature sensor 151 on which a signer 110a may make a signature using a pen or stylus 110b. In some embodiments, the signer 110a may make a signature without a pen or stylus 110b, such as with a finger (e.g. on a surface or in the air) or hand (e.g., using gestures, etc.). In some embodiments, the pen or stylus 110b may be configured to communicate either wirelessly, using a wireless connection 111a, or with a wired connection 111b to a device, such as the access point 130, or another receiving device. Alternatively, or in addition to, the signature device 150 may be a dedicated device with a dedicated signature sensor device, such as the signature sensor 151. The signature device 150 including the signature sensor 151 may be coupled to a computing device or system, such as a computing device 120, either locally or through a network connection. For example, the signature device 150 and signature sensor 151 may be coupled through a wireless link 153a or through a wired link 153b to an access point 130. The access point 130 may be coupled to a computing device 120 through either a wireless connection 121a or a wired connection 121b. Alternatively, or in addition to the signature device 150 and signature sensor 151 may be coupled directly to the computing device 120 through a link 153c. The link 153c may be a wireless or wired connection. For example, a wireless connection may be established between the signature device 150 and the computing device 120 through an access point 130 having an antenna 132.

The signature device 150 may be a computing device, such as a tablet, which may have a touch screen or other surface that may correspond to the signature sensor 151. The signature sensor 151 may also be a pressure sensitive surface, electric field sensitive surface or other quantity sensing surface that is capable of sensing one or more quantities of a pen or a fingertip on the surface thereof, such as the position, movement, pressure, and/or acceleration, and generate data associated with the movement of a pen or fingertip during signing. The signature sensor 151 may also work in connection with an electronic pen that may have quantity sensing capabilities.

In the various embodiments, one or more biometric sensors 155 may be included in system components and configured to sense and provide samples of biometric quantities (e.g., Bio 1, Bio 2, . . . Bio n). The biometric sensors 155 may be coupled to one or both of the signature device 150 and signature sensor 151. The biometric sensors 155 may be coupled to the network 100 (and to computing device 120) through a wireless link 157a or a wired link 157b to the access point 130. Alternatively, or in addition to, the biometric sensors 155 may be coupled directly to the computing device 120 through a connection 157c, which may be a wired or wireless connection. The biometric sensors 155 may be configured for sampling or may provide an output that is sampled in the signature device 150, the computing device 120 or other remote computing device or devices. Because the biometric data may be sensitive, protection of biometric samples may be prudent in order to avoid any spoofing, interception, or intrusion. Further, the system may protect any communication of the biometric samples, particularly when the biometric data will be traversing nodes in a network.

In the various embodiments, the computing device 120 may be coupled to a storage device 123, which may be internal or external memory or storage media. The storage device 123 may be used to store information used to validate the signature and biometric samples. The storage device 123 may be used to store some or all of the collected signature and biometric data, including samples and sample authentication results, logs, and other information associated with signature validation. The storage device 123 may store information associated with the completed signature verifications, such as a certification that the signature is valid. In some embodiments in which the verified signature and biometrics are bound together, such as with an electronic version of the signed document, the combined and bound data may also be stored in the storage device 123.

In the various embodiments, the access point 130 may be coupled to a public network, such as the Internet 102. The connection to the Internet 102 may be facilitated by a service provided, such as an Internet Service Provider (ISP) 133 to which the access point 130 may be connected through a connection 131. In some instances, the connection 131 may be a broadband connection, such as a coaxial or fiber-optic connection. In some embodiments, information associated with the signature process may be stored in the "cloud" such as in a cloud storage device 141. The cloud storage device 141 may be a storage device that is operated by one or more third party storage providers. In embodiments in which cloud storage is used, additional data security considerations may be implemented.

In the various embodiments, one or more remote servers 140 may be used to facilitate signature verification operations that are accessible to the signature device 150, and the computing device 120 through the connection to the Internet 102. The remote servers 140 may be provided with storage elements 143 that can be used, as described above in connection with storage device 123. Additionally, the storage elements 143 may provide additional information, such as aggregated storage from a series of the signature devices 150. For example, a notary service provider may install a series of the signature devices 150 that are linked to a remote server or servers 140 through the Internet 102 to provide electronic notary services in accordance with embodiments disclosed herein.

Figure 1B:
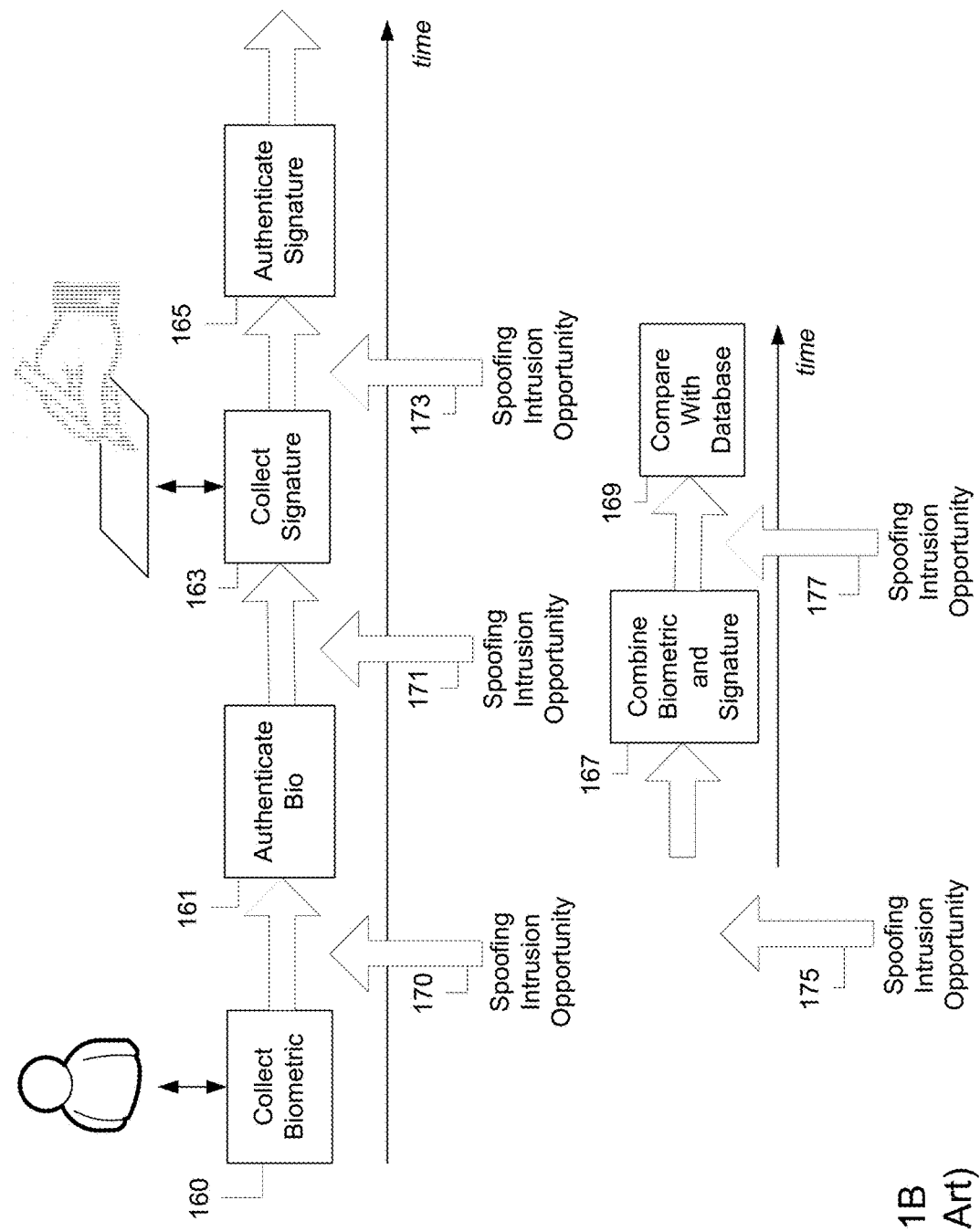
FIG. 1B is a block diagram illustrating conventional signature and biometric collection and potential spoofing and intrusion points.

The various embodiments may reduce or eliminate spoofing, interception, or intrusion opportunities posed by conventional systems as illustrated in FIG. 1B. A conventional electronic or electronic assisted signature collection process and optional biometric capture process provides many opportunities in which an intruder could capture sensitive signature or biometric information for later use in an identity spoofing attempt. For example, an unauthorized entity could intrude into a signature making and validation process by substituting previously captured data or synthesized data in an attempt to spoof an identity verification system. In an example of a conventional system, in block 160, a biometric may be collected from an authorized individual (i.e., the actual person whose signature is required).

In block 161, the collected biometric may be authenticated. During the interval between block 160 and 161, a spoofing intrusion opportunity 170 is presented. For example, an intruder could substitute the biometric collected in block 160 with a sample biometric from the person who is supposed to be signing the document, thereby causing authentication to be performed in block 161 on a biometric that was not collected in block 160. Thus, if such spoofing is implemented the biometric evaluated in block 161 may be from the authorized individual collected surreptitiously or in an unauthorized manner that an unauthorized individual substitutes for his own biometric in order to be authorized to sign the document in block 161.

In block 163, the successful authentication may proceed to a signature collection procedure in which the signature of the authorized individual is obtained. As discussed herein, the signature may involve any of a pen writing a signature on paper, an electronic pen signing an electronic document, a finger tracing a signature on a touch screen interface, a gesture made in space within a virtual reality system or other gesture-recognizing system, or similar mechanisms. The interval between the authorization in block 161 and the signature collection in block 163 may provide another spoofing intrusion opportunity 171. For example, based on the unauthorized biometric supplied to the authentication procedure, the authentication block may generate an authentication based on the unauthorized biometric. Alternatively, the intruder may simply synthesize an authentication in the spoofing intrusion opportunity 171 that allows the signature to be collected in block 163.

After the biometric and the signature collections are completed, the collected signature may be authenticated in block 165. During the interval between block 163 and 165, another spoofing intrusion opportunity 173 is presented. For example, an intruder could substitute the signature collected in block 163, which the system may assumed to be from the actual individual, with a signature that was not collected in block 163. While the signature may nevertheless be from the authorized individual, it may have been synthesized, collected surreptitiously or may have otherwise been obtained in an unauthorized manner and is in the possession of an unauthorized individual. For example, an unauthorized individual may attempt to supply the unauthorized signature data of the authorized individual as an input to the block 165, whereupon it may be authenticated.

In block 167, the authentication of the signature and previously authenticated biometric may be combined in some systems. The interval between the signature authorization in block 165 and the signature and biometric combination in block 167 may provide another spoofing intrusion opportunity 175. For example, based on one or more of the authentication of the unauthorized biometric and the authentication of the unauthorized signature the authenticated unauthorized signature and biometric may be combined to produce combined data which may purport to represent an authorized completed, authenticated signature.

In block 169, the combined signature and biometric may be compared with information stored in a database or may be stored in the database. The interval between the combining of the signature and biometric data in block 167 and the comparison in block 169 may represent a further intrusion opportunity 177. For example, the combined signature and biometric data may be based on unauthorized signature and biometric data. Alternatively, combined synthetic data or combined data obtained in an unauthorized manner may be provided for comparison in the block 169, and so on. The aforementioned examples of intrusion opportunities are non-exhaustive, and other intrusion opportunities may exist depending on the architecture and design of an authentication system. However, based on the illustrated examples, the drawbacks of conventional systems become clear from an appreciation that when sensitive data is collected at different times, and in discontinuous steps, opportunities arise for unauthorized capture, substitution and intrusion into the signature verification process.

Figure 1C:
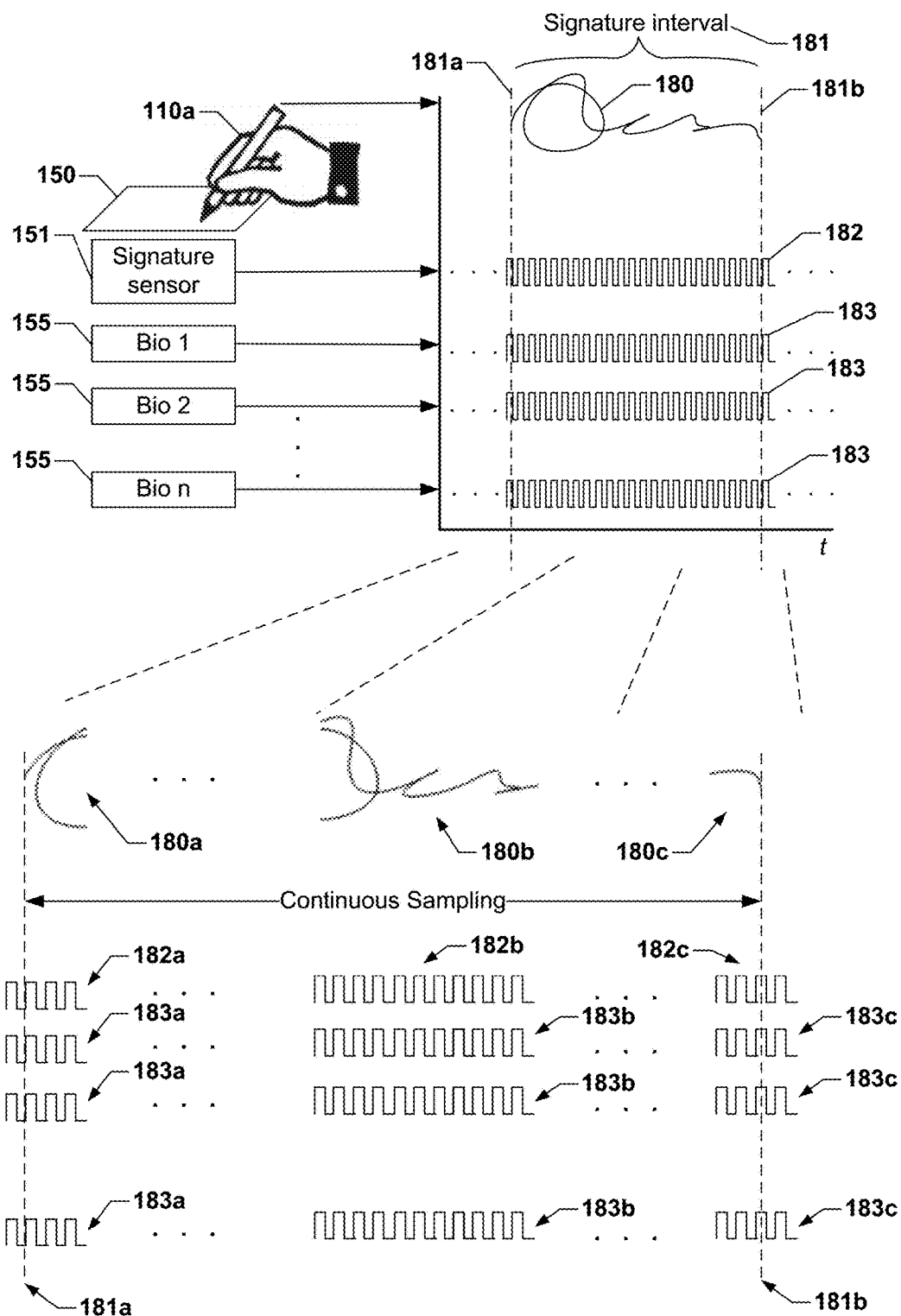
FIG. 1C is a block diagram illustrating simultaneous signature and continuous biometric sampling in embodiments.

To address the disadvantages of conventional signature verification systems, the various embodiments may continuously sample a biometric while a signature is being made as illustrated in FIG. 1C. In the various embodiments, using the signature device 150 including the signature sensor 151 and one or more of the biometric sensors 155, the signer 110*a* may make a signature 180 during a signature interval 181 while one or more biometrics (Bio1, . . . Bio n) are continuously sampled. The signature 180 may be captured during the signature interval 181, which is defined by a signature start time 181*a* and a signature end time 181*b*. The signature start time 181*a* and the signature end time 181*b* may be detected by detecting pen-down and pen-up events that trigger the beginning and the end of the signature interval 181. Alternatively or in addition, the signature start time 181*a* and the signature end time 181*b* may be designated by the system. By way of examples, the signer 110*a* may prompted to begin the making of the signature 180 at the designated signature start time 181*a*, the signer 110*a* may be prompted to end the making of the signature 180 at a given time, or the signer 110*a* may be prompted to provide an input that indicates that the making of signature 180 is completed. Such an input may mark the signature end time 181*b*. Alternatively, the system may detect when the signature making is ended indicating the signature end time 181*b*. Combinations of the above described approaches are further possible. For example, the system may designate a signature start time 181*a*, and may detect when a pen-down or finger-down condition occurs. Similarly, the system may detect the contact with the signature device 150 and detect when the signature sensor 151 has ended at which time the signature end time 181*b* may be asserted.

While the signature 180 is being made during the signature interval 181, the signature may have a signature beginning portion 180*a*, a signature middle portion 180*b*, and a signature end portion 180*c*. In some embodiments, alternatively or in addition to detecting pen-down or finger-down conditions, the signature beginning portion 180*a* may be detected by the signature sensor 151 as a way to determine the start of the signature interval 181. Similarly, the signature sensor 151 may detect the signature end portion 180*c* as a way to determine the end of the signature interval 181.

While the signature 180 is being made during the signature interval 181, samples 182 may be taken of the signature making process. For example, one or more of image, movement, acceleration, and pressure samples may be generated by the signature sensor 151, while the signature 180 is being made. The samples 182 may be taken during the signature interval 181, such as samples 182*a* of the signature beginning portion 180*a*, samples 182*b* of the signature middle portion 180*b*, and samples 182*c* of the signature end portion 180*c*. Biometric samples 183 may be taken of one or more biometrics (Bio 1, . . . Bio n) from respective biometric sensors 155. The biometric samples 182 and 183 may be taken continuously and simultaneously during the signature interval 181, while the signature 180 is being made by the signer 110*a*. The biometric samples 183 may be taken during the signature interval 181, such as samples 183*a* of the signature beginning portion 180*a*, samples 183*b* of the signature middle portion 180*b*, and samples 183*c* of the signature end portion 180*c*. The signature 180 is described herein as having a beginning portion, a middle portion, and an end portion; however, these portions are for illustrative purposes. The signature 180 may be made according to a typical signature making process and may have more or fewer portions such as pauses, pen lifts, and other individual characteristics, which may be factored into the signature sampling process. For example, pen lifts may result in samples having little information, while the continuity of the sampling may be maintained during the pen lifts. Further, a continuous signature may be subdivided into a large number of brief subintervals (e.g., defined by the amount of time required to obtain any one biometric sample) or portions for purposes of continuous sampling and verification.

However, any interruptions in the continuous sampling may be detected and treated as indicating an intrusion attempt. In some embodiments, interruptions in continuous biometric sampling may be detected based on the expectation that the biometric samples will be generated at particular intervals (e.g., every few milliseconds). When a sample is not received at an expected time, an error or flag condition may generated that causes either the signature to be immediately invalidated, or a possible error condition to be determined. In further embodiments, interruptions may be detected based on a continuity evaluation between samples. For example, samples may be provided with a sample sequence number, whereupon a condition of out of sequence samples will alert the processor or system to the possibility of intrusion. In other examples, a code may be inserted into each sample, whereupon a sample that fails to include the code may alert to a possible intrusion condition. In another example, the packaging or content profile of the sample may be monitored so that changes to the sample may be detected. In another example, the sourcing of the sample, such as a device identifier of a sampling device, from the start/output point to the end/input point and all areas in between may be monitored so that any anomalies to a sample may be able to be detected as an intrusion in the continuity.

The biometric samples 182, 183 may further be separately validated during the signature interval 181. Each of the biometric samples 182 and 183 may be individually validated or selected ones of the biometric samples 182 and 183 may be validated. If a sample fails to be authenticated, the signature 180 may be immediately invalidated, or the condition may be reported and additional measures may be conducted before the signature 180 is invalidated. For example, it may be possible that the sample to be validated contained an error or errors. In such an example, an error correction procedure or similar procedure may be invoked to determine whether the sample can be authenticated if the error is corrected. Alternatively, the continuous sampling may be configured to tolerate errors according to a threshold. An example threshold may include a threshold number of overall errors during the signature interval 181, a threshold number of errors per sub-interval, a threshold number of successive (e.g., contiguous) errors, and so on. For example, a periodic single error may be tolerated, while three consecutive errors may be flagged as a possible intrusion attempt whereupon the signature authentication may not be successfully completed.

The signature interval 181 may be a time window during which continuous sampling will be conducted and interruptions in the signature collection and verification and biometric collection and verification procedures will be detected. The detection of an interruption in one or more of the signature and biometric sampling will indicate a possibility that an intrusion has occurred. In some embodiments, the continuity of the biometric sampling may be of greater importance as it may not be unusual for small interruptions to occur in the signature making process. Thus, separate conditions may apply to signature sampling and biometric sampling. However, regardless of whether small interruptions occur while the signer 110*a* is making the signature 180, embodiment systems may not validate a signature when there are interruptions in the continuous sampling of the biometric sensor 155.

Figure 2A:
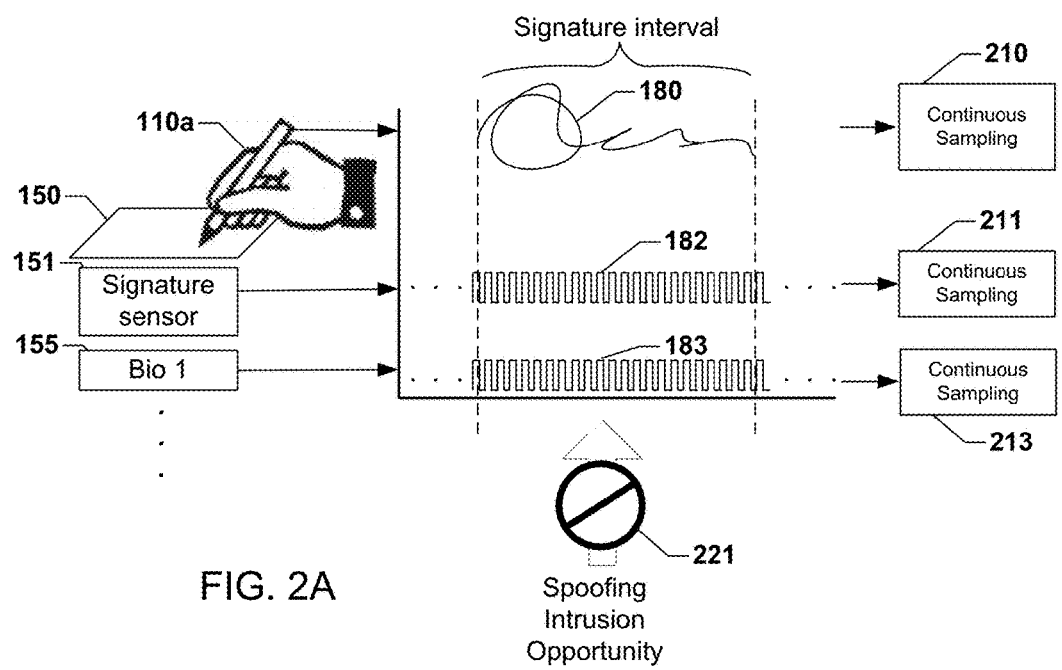
FIG. 2A and FIG. 2B are diagrams further illustrating simultaneous and continuous sampling and authentication in the various embodiments.
Figure 2B:
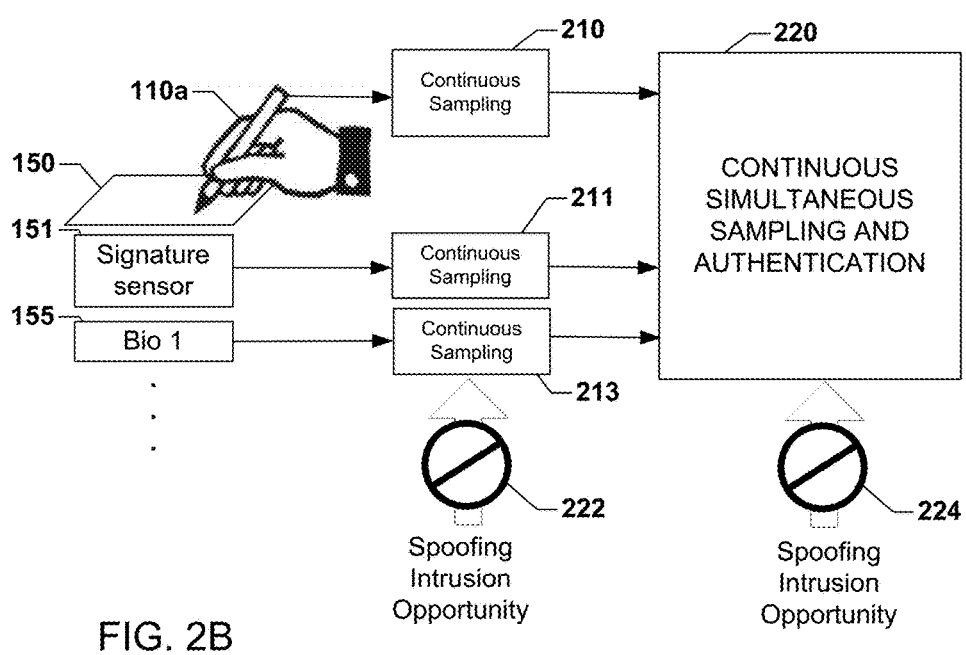

In the various embodiments, the continuity of biometric sampling during the signature-making interval may be important in preventing intrusion as illustrated in FIGS. 2A and 2B. As described above, continuous sampling 213 of one or more biometrics from the biometric sensors 155 and the generation of continuous streams of the biometric samples 182 and 183 may be performed at the same time that the signer 110*a* makes a signature 180 on the signature device 150 that is recorded as a continuous sampling 210, 211 of the signature using the signature sensor 151, and a. The simultaneous and continuous generation of biometric samples 182, 183 may have the effect of blocking a spoofing intrusion opportunity 221, or any opportunities for intrusion, since any intrusion would have a high likelihood of disrupting at least the integrity of some of the biometric samples 182, 183. Similarly, as illustrated in FIG. 2B, simultaneous and continuous processing in block 210, 211 and 213 of the biometric samples 182, 183 may have the effect of blocking a spoofing intrusion opportunity 222, or any opportunities for intrusion since any intrusion would have a high likelihood of disrupting at least the continuity of some of the biometric samples 182, 183. Further, continuous authentication in block 220, may have the effect of blocking a spoofing intrusion opportunity 224, or any opportunities for intrusion since any intrusion would have a high likelihood of disrupting at least the authentication of some of the biometric samples 182, 183.

Figure 3A:
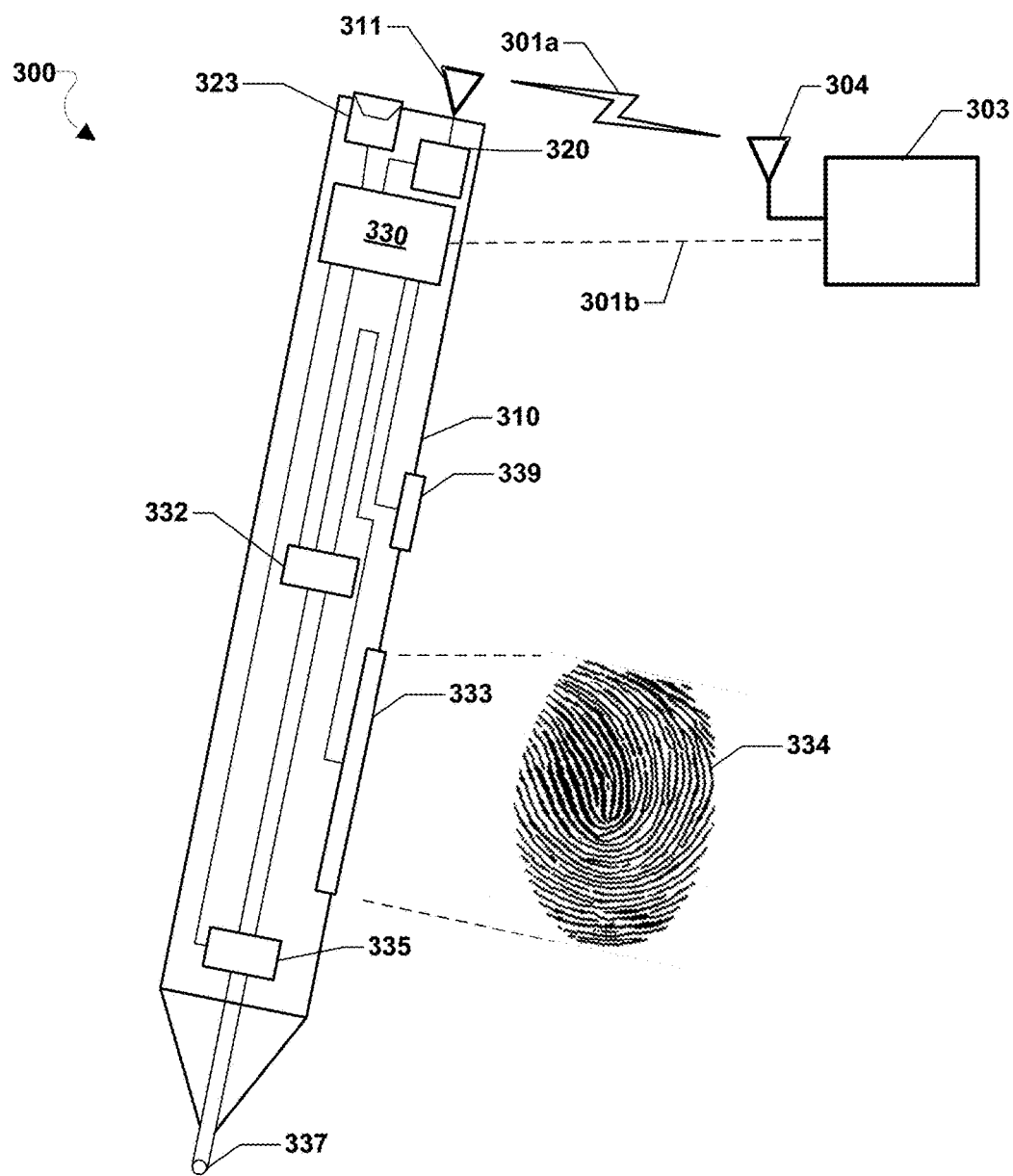
FIG. 3A is a diagram illustrating components of an electronic pen and biometric sensor suitable for use with the various embodiments.

Thus, in the various embodiments, the simultaneous and continuous sampling of the signature and the biometrics may form an important part of preventing intrusion by eliminating time windows that present intrusion opportunities. An example of an electronic writing instrument system 300 having one or more signature and biometric sensors is illustrated in FIG. 3A. An electronic writing instrument 310 may include with a biometric sensor 333, which in the illustrated example is a sensor for reading a fingerprint 334. The electronic writing instrument 310 may have one or more sensors for detecting movement and other quantities, which may be biometric quantities. For example, the electronic writing instrument 310 may include a pressure sensor 335 for measuring pressure on a writing tip 337, an accelerometer 332 for measuring movement of the electronic writing instrument 310, a camera 323 for taking an image or series of images that may be used for generating biometric measurements, and a radio communication module 320. In embodiments the electronic writing instrument 310 may include an ultrasound module 339 for sending and receiving ultrasound or other acoustic signals, such as for tracking the movement of the electronic writing instrument 310.

The electronic writing instrument 310 may be configured with a processor 330 that receives data from and controls the operation of one or more of the various sensors. The processor 330 may be configured with certain algorithms and processor instructions that enable the processor to perform certain sampling operations and to detect the continuity of samples, such as the biometric sensor 333. The processor 330 may detect when an interruption in the continuity of the biometric samples occurs. The processor 330 may further detect when authentication failure of one or more of the biometric samples occurs. Alternatively, the processor 330 may simply control the generation and communication of samples from the electronic writing instrument 310 to a device, such as the signature device 150, the computing device 120, the remote server or servers 140 and so on.

The electronic writing instrument 310 may be configured to communicate the sensor quantities to a receiver or transceiver 303 through the radio communication module 320. A wireless link 301a may be established between an antenna 311 coupled to the radio module 320 and an antenna 304 coupled to the transceiver 303. Alternatively, the electronic writing instrument 310 may be coupled to the transceiver 303 through a wired connection 301b. The instrument may communicate sample data associated with the sensors to a device, such as the signature device 150, the computing device 120, the remote server or servers 140 and so on. In the various embodiments, a device, such as the electronic writing instrument 310 may provide the ability to simultaneously obtain continuous samples of the signature and at least one biometric. Other examples are possible.

Figure 3B:
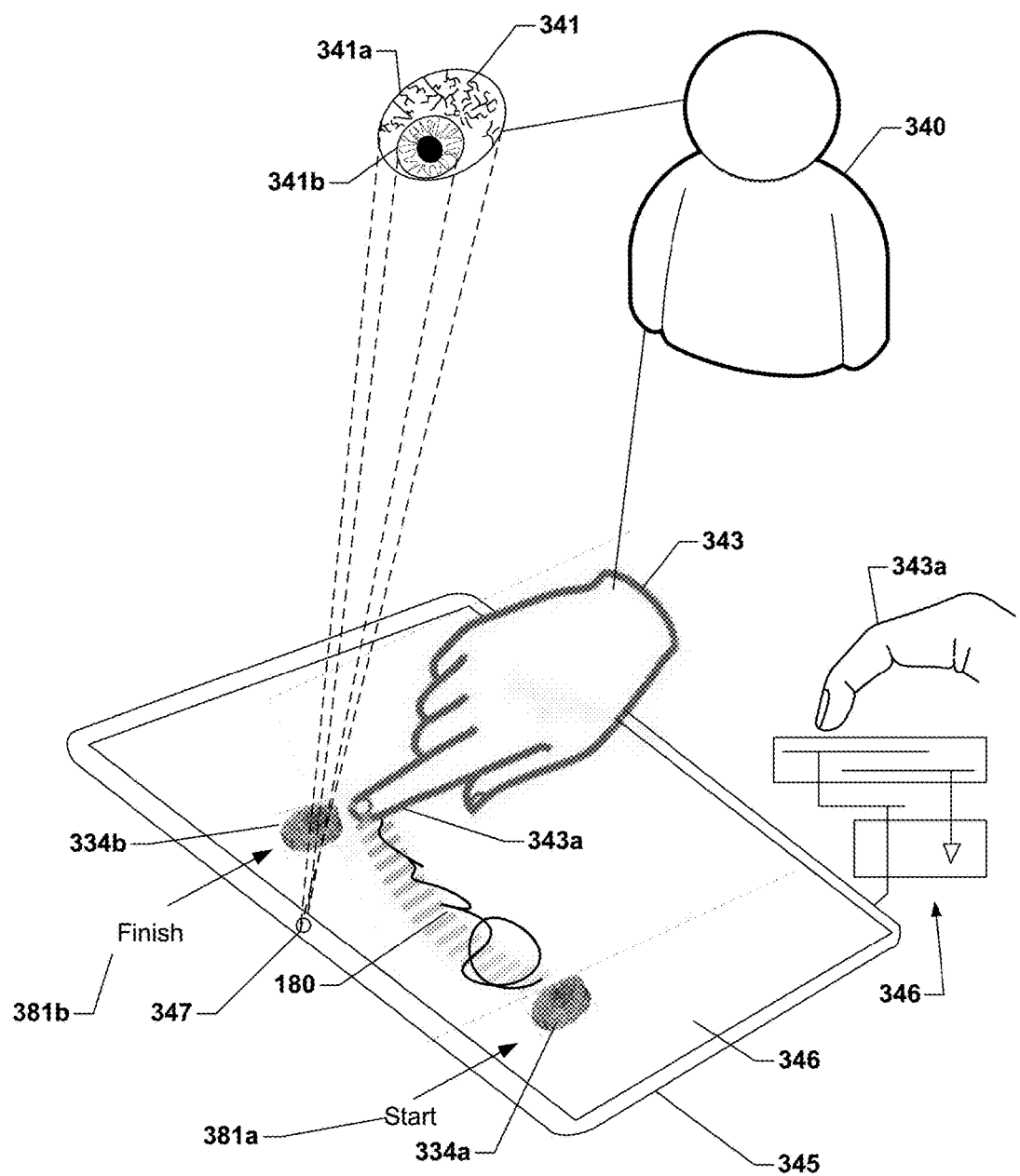
FIG. 3B is a diagram illustrating interaction between a signer, a touch screen device and biometric sensor in the various embodiments.

As illustrated in FIG. 3B, a computing device 345, such as a tablet computing device, may be configured with a touch sensitive screen 346, which in embodiments, may be a capacitive touch sensitive screen. A signer 340 may use a finger of a hand 343 to make the signature 180 by touching the touch sensitive screen 346 at a start time 381a. At the start time 381a, the signer 340 may place a finger of his/her hand 343 on a location on the touch sensitive screen 346 to begin to swipe out a signature. The finger down condition or event may further trigger the beginning of a signature interval as described herein above. By placing the finger 343a on the touch sensitive screen 346, a finger print 334a may be detected as a biometric and sampled continuously throughout the swiping action during the signature interval. The signer 340 may continue to make the signature 180 during the signing interval until finished at end time 381b. When the signature is finished at the end time 381b, a finger print 334b may be detected. The touch sensitive screen 346 may be configured to continuously sample the finger print from finger print 334a to 334b as the signature is swiped out during the signature interval (e.g. from start time 381a to end time 381b). In addition the touch sensitive screen 346 may be used to simultaneously sample the actual signature 180 for consistency with known samples or other biometrics, such as the speed, acceleration, image characteristics, and other quantities associated with the signature 180.

Figure 3C:
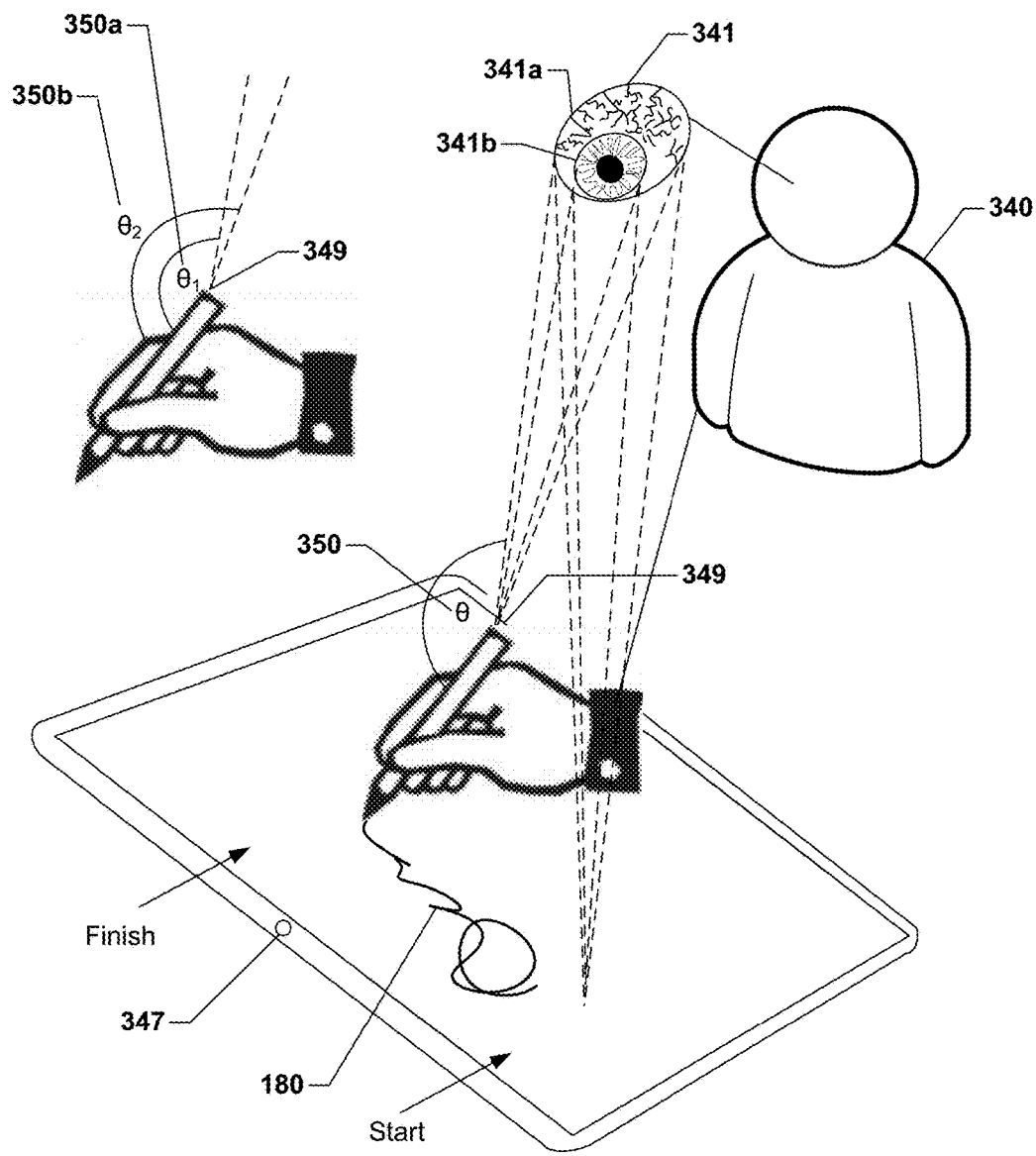
FIG. 3C is a diagram illustrating interactions between a signer, a pen, a touch screen device and biometric sensor in the various embodiments.

In the various embodiments, additional biometrics may also be simultaneously and continuously sampled as further illustrated in FIG. 3C. For example, while the signer 340 is swiping out the signature 180, a camera 347 may be used to perform a continuous biometric sampling of an eye 341 or eyes, of the signer 340. For example, the camera 347 may be used to perform a continuous sampling of an iris 341a, a retina 341b, or other eye characteristics, such as eye movement during the making of the signature 180. As further illustrated in FIG. 3C, additional biometrics may be made based on combining inputs from various sensors. For example, a camera 349 in a writing instrument may be used to detect and continuously sample a biometric associated with the eye 341 or eyes of the signer 340. In addition to sampling the biometric, the camera 349 may be used to detect changes in a relative angle θ 350. For example, as the signature 180 is made, the relative angle θ 350 may change, such as from an angle $\theta_1$ 350a to an angle $\theta_2$ 350b and so on, throughout the signature interval. The characteristic changes in the angle θ 350 may serve as a further biometric that may be continuously sampled and validated throughout the making of the signature 180 during the signature interval 181.

Figure 4A:
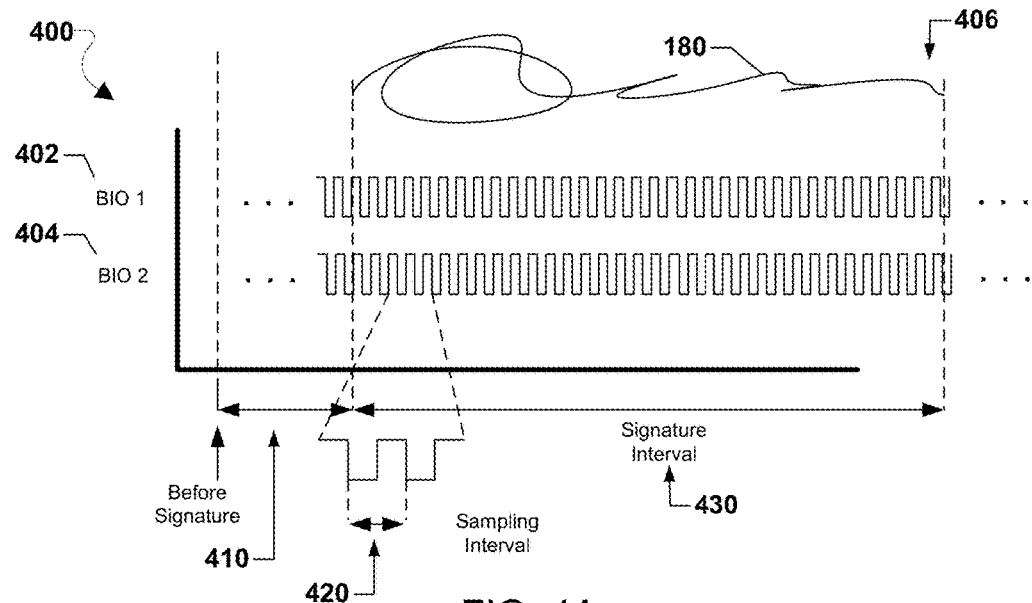
FIG. 4A is a timing diagram illustrating timing for a signature interval and continuous biometric sampling in the various embodiments.

In the various embodiments, the validation of a signature by simultaneous continuous sampling of a biometric while a signature is being made may rely on the regular sampling and validation of each biometric sample taken in a sampling interval as illustrated in FIG. 4A. In the illustrated embodiment 400, the signature 180 may be made during a signature interval 430 as previously described herein. During the signature interval 430, a first biometric quantity (Bio 1) 402 and a second biometric quantity (Bio 2) 404 may be continuously sampled to generate sample streams. In some embodiments, continuous sampling may begin before the signature interval 430 in a before signature interval 410. During or before signature interval 410 the biometric sensors may begin sampling to ensure their operation prior to beginning the signature making, validation procedures and the sampling and validation of the biometric quantities. In other examples, the sampling may begin concurrently with the beginning of the signature interval 430 (e.g., when the start of signature making is detected).

In the various embodiments, the continuous sampling may be an uninterrupted sampling process in which a sample of a biometric quantity is taken during a sampling interval 420, and in successive sampling intervals (e.g., every sampling interval). Sampling may be associated with various sample capture mechanisms, such as capturing a camera image, taking a data reading from an analog to digital converter, taking a reading from a sensor, such as a fingerprint sensor or scanner, or other sample capture mechanisms. The sampling interval 420 may be an amount of time required to acquire a complete biometric sample, which may depend on the type of sensor, the type of data, the amount of data, the underlying quantity, processing time for verification, and other factors. However, the sampling interval 420 should be sufficiently short such that any interruptions in the continuous sampling process can be easily detected. For example, the sampling interval 420 could be microseconds or milliseconds and still provide for processing associated with sample verification. However, a sampling interval 420 of several seconds may allow sufficient time for an intrusion, such as when non-authorized samples are substituted for samples generated in the sampling mechanism during the signature process.

Figure 4B:
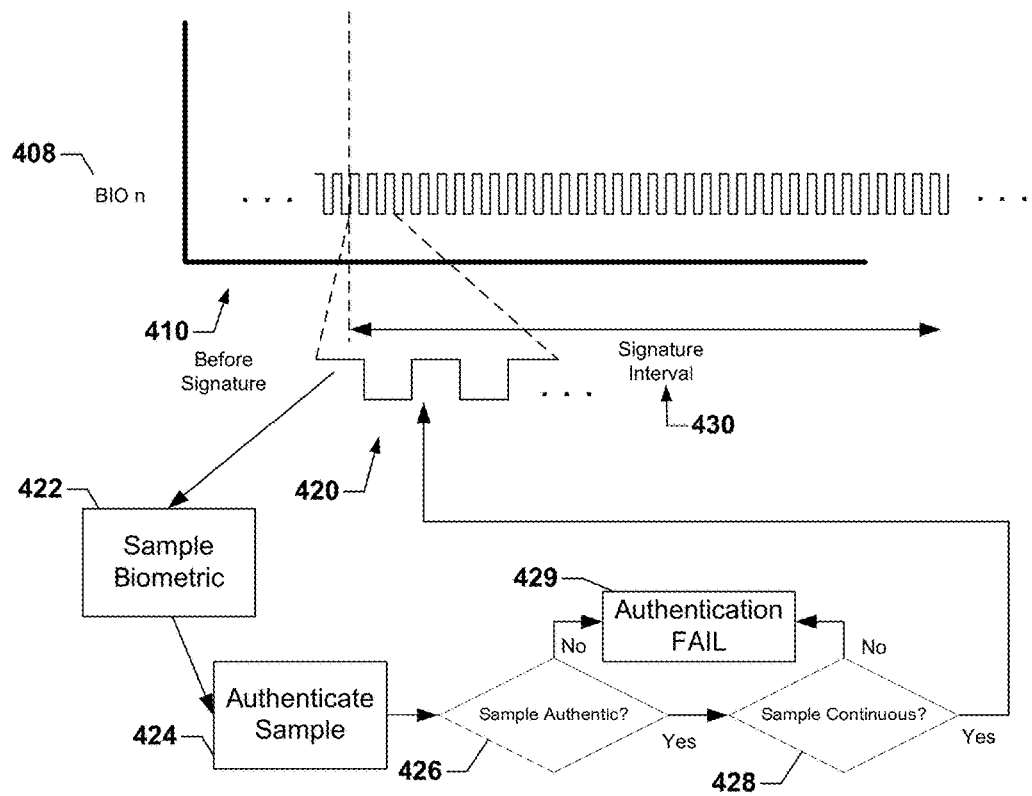
FIG. 4B is a timing diagram illustrating timing for a signature interval and continuous biometric sampling with authentication in the various embodiments.

In the various embodiments, an example procedure for continuous sampling and verification of samples simultaneously with the signer completing the signature 180 in the signature interval 430 is illustrated in FIG. 4B. At the beginning of the sampling interval 420, a processor may obtain a sample of a biometric in block 422. In block 424, during the sampling interval 420, the processor may authenticate the sample by verifying, validating or otherwise checking the signature for authenticity. In block 426, the processor may determine whether the sample is authentic. In response to determining that the sample is authentic (i.e., determination block 426="Yes") the processor may further check the sample for continuity in determination block 428. In response to determining that the sample is continuous (i.e., determination block 428="Yes"), the processor may consider the sample valid and the processing may return to take the next sample in the next sampling interval 420. In response to determining that the sample is not authentic (i.e., determination block 426="No"), the processor may fail the authentication of the sample in block 429. In response to determining that the sample is not continuous (i.e., determination block 428="No"), the processor may fail the authentication of the sample in block 429. When the authentication by the processor fails, the processor may fail the signature verification. The failed signature authentication may be acted upon, such as by the processor providing an indication of failure, either immediately or at the end of the signature interval 430. In some instances, the failure of authentication may be due to a data error. Therefore, a failure of authentication of a particular sample may not necessarily result in a failed signature verification based on factors, such as the acceptable error tolerance.

Figure 5:
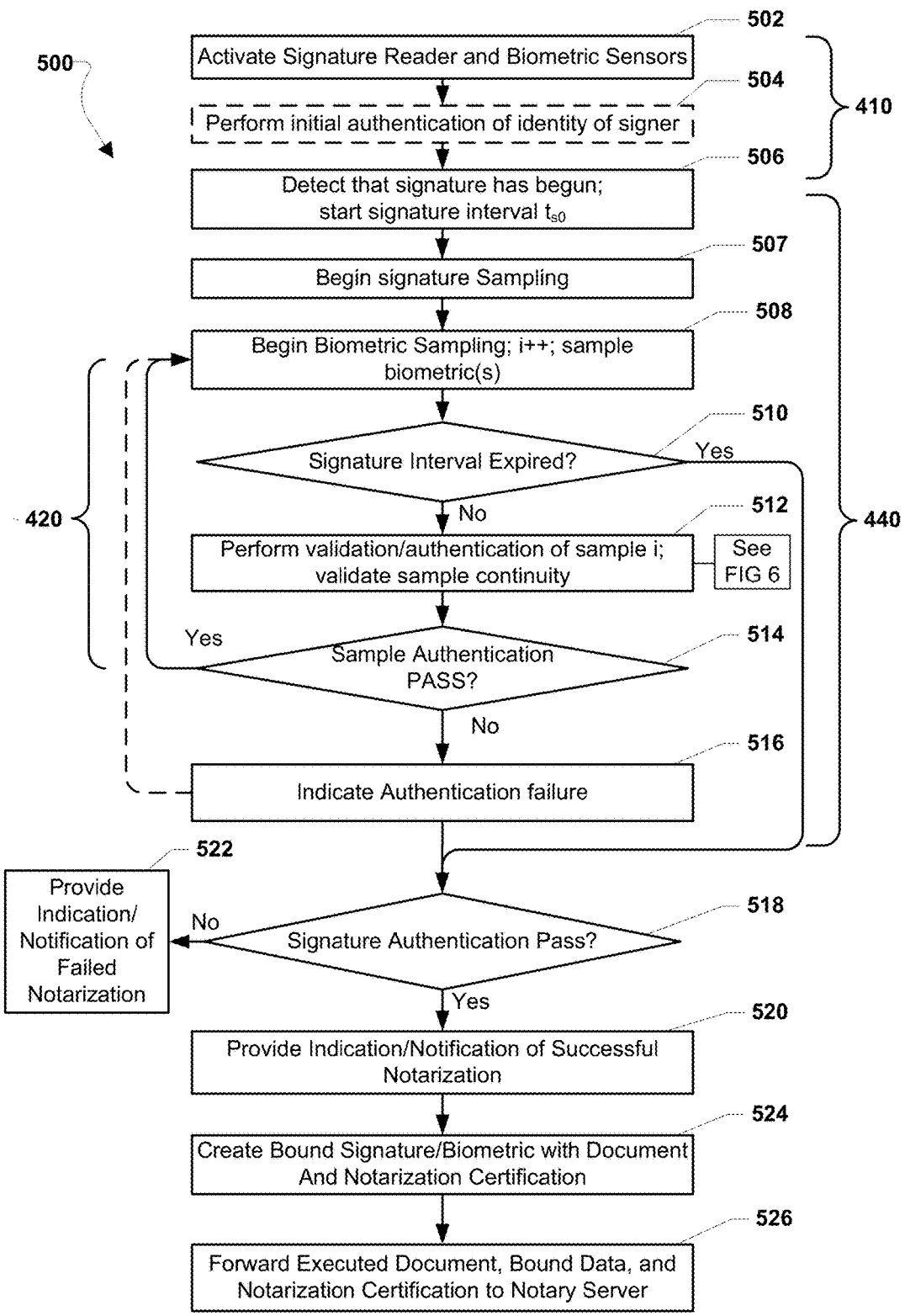
FIG. 5 is a process flow diagram illustrating an embodiment method for simultaneously authenticating a signature and performing continuous biometric sampling.

An embodiment method 500 for authenticating, including performing simultaneous signature making, verification, continuous sampling and verification of one or more biometrics is illustrated in FIG. 5. To perform the operations of the embodiment method 500, in block 502, a signature device, such as the signature device 150, the signature sensor 151, the computing device 120, or signature devices working together with remote computing devices, such as remote servers 140, may be activated along with one or more biometric sensors 155. In some embodiments, in block 504, the identity of the signer may optionally be initially authenticated by a processor through an initial reading and verification of one or more of the biometric quantities. The identity of the signer may be authenticated through a manual identity verification, such as by a person who checks an identification of the signer (e.g., driver's license, passport, etc.), for example, to determine whether the signer's identification at least corresponds to the person the signer is purporting to be.

In block 506, during the before signature interval 410, the processor may detect the beginning of the signature and the signature interval may be started by the processor. For example, the processor may detect the beginning of the signature by detecting a pen-down, finger-down, or other indication that the signature making process has begun. As described herein, detecting the beginning of the signature may mark the beginning of the signature interval. Alternatively, the beginning of the signature interval may be designated by the processor, such as by providing a ready state designation that indicates when the signature and biometric sensors are ready for detection and that the signer may proceed to make the signature. Further, the processor may detect the beginning of the signature and the start of the signature interval based on a combination of a designated ready state and detection of a pen-down, finger-down or other indication that the signature making process has begun.

In block 507, when the processor may detect that the signature making process has begun and the signature interval has started, the processor may sample the signature. In some embodiments, in response to the processor detecting the first movements of the signature making, the beginning or start of the signature interval may be designated by the processor. In other embodiments, the start of the signature interval may be designated by the processor and the signer may then start making the signature. The processor may sample the signature through a sampling of the trace of a pen, including an ink pen or electronic pen, a stylus including an electronic stylus, a finger tip or physical implement on a tablet, such as a touch sensitive tablet, or of a gesture made in space (e.g., by hands moving in space as recorded by a virtual reality or 3-D camera system). In some embodiments, the implement or body part used to make the signature may not be in contact with the tablet or signature device and the signature may be in the form of movements (referred to as "gestures") of the implement or body part in 3-D space that may detected and tracked through movement, optical sampling, or a combination of sampling mechanisms detectable by the processor. In such embodiments, the processor may sample a gesture based signature (e.g., movement of a body part or implement in 3-D space) through the use of optical sampling using a camera, a 3-D camera system, a virtual reality system, or an optical or light based system using visible and non-visible spectra (e.g., infrared, etc.). In some embodiments, the processor may perform 3-D motion detection and sampling through non-optical sampling, such as ultrasonic or acoustic ranging and tracking system that tracks the location and movement of an implement or body part through echo location. In some embodiments, the processor may perform 3-D motion detection and sampling using electronic devices that enable separation distances to be measured through wireless mechanisms, such as an emitter on the tip of an implement or on the user's wrist and a receiver/ranging device. In some embodiments, the processor may sample a gesture made with a finger, hand, arm, arms, head, leg, legs, and whole body (referred to herein generally as "a body part") moving through a predefined sequence of movements in space (e.g., a sequence of movements that have been taught to the processor or the system by the signer). Such embodiments may facilitate a wide variety of signature making that may be more unique than convention pen-and-ink signatures and better suited to some individuals, such as disabled persons.

In block 508, simultaneously with sampling of the signature, the processor may perform a first sampling of one or more biometrics, such as during a sampling interval. The processor may perform the sampling through an image capture mechanism, an analog to digital sample, or other data sample that reflects the underlying biometric. For example, in the case of a finger print biometric, the processor may perform the sampling by capturing a finger print image from a camera device. In other finger print biometric examples, the processor may perform the sampling by capturing a finger print generated from a touch sensitive device, or other device. The sampling data captured by the processor may include a finger print image, finger print characteristic data, or other data associated with the biometric. For example, a finger print sensor may be camera based, but rather than generate image data, the sensor may be configured to generate samples that are characteristic of or derived from the finger print image, such as samples that contain finger print features and feature locations according to a standard format. The signature may be sampled by the processor to generate a sequence of signature samples that may be verified individually by the processor as they are being generated. Alternatively, the biometric samples may be validated as a group by the processor. In some embodiments, validation of individual samples or groups of samples by the processor may occur during the signature interval. Validation of the entire sequence of signature samples by the processor may occur when the signature interval is ended (e.g., when the signature making is completed).

In some embodiments, the complexity of the biometric data and the degree of processing required to verify or validate the biometric data may influence the length of the sampling interval. Because more complex analysis may require more complex processing, and therefore more time, complex sensors may require a longer sampling interval. It is further possible that the sampling interval for different biometric sensors may be different. In the event that different sampling intervals are used for different sensors, an additional degree of continuity verification may be provided by the time "diversity" represented by the different sampling intervals. In other words, the continuity of the sample streams may be independently confirmed by the processor as an added measure of verification.

In determination block 510, a processor may determine whether the signature interval has expired. During signature making, in response to determining that the signature interval has not expired (i.e., determination block 510="No"), the processor may validate, authenticate, or otherwise confirm the captured sample from the biometric sensor, optionally with additional samples from additional biometric sensors, in block 512. The processor may conduct validation, authentication, confirmation and/or verification, by comparing the biometric sample to a known good sample stored in a memory, or by other authentication methods. If the sample is taken along with a code, the processor may validate the code. The processor may establish the sampling code at the beginning of the signature session such that it may be more likely to be protected from intrusion. The processor may use other validation, authentication, or confirmation methods.

In some embodiments, the processor may independently validate, authenticate the sample (i.e., apart from other samples from the same biometric sensor). Alternatively, the processor may collect and authenticate more than one sample as a group from the same or from multiple biometric sensors. In some embodiments, the processor may collect the biometric samples during the signature interval, along with verifying that each sample was actually collected from the corresponding biometric sensor during the signature interval. The processor may then authenticate the group of samples at the end of the signature interval. In some embodiments, the processor may check each sample for continuity. Continuity checking may involve the processor checking that a first biometric sample taken during a first sampling interval is contiguous with a second biometric sample taking during a second sampling interval. Operations of embodiment methods may be further described in connection with FIG. 6. Thus, in embodiments, the processor may continuously sample one or more biometrics to generate a sequence of biometric samples. The processor may validate the generated sequence of biometric samples as each sample is being generated. Alternatively, the processor may validate some or all of the biometric samples together as a group.

In determination block 514, the processor may determine whether the sample authentication has passed (i.e., was successful). In response to determining that the authentication of the sample, which may include a checking the continuity of the sample, passes (i.e., determination block 514="Yes"), the processor may take the next sample for the next sampling interval 420 in block 508. The processor may perform an authentication and a continuity check for the next sample, and so on during the signature interval. In response to determining that the authentication of the sample, which may include checking the continuity, does not pass (i.e., determination block 514="No") the processor may provide an indication of the failed sample in block 516. In some embodiments, in response to determining that the signature interval has expired (i.e., determination block 510="Yes") or when an indication is provided that the authentication of a sample fails in block 516, the processor may determine whether the authentication of the signature has passed in block 518. For example, as will be described in greater detail, the processor may tolerate a certain number of sample authentication and continuity errors. When the biometric samples have been collected and authenticated, and checked for continuity, notwithstanding possible errors, the processor may determine the authentication status. In response to determining that the signature authentication has passed (i.e., determination block 518="Yes"), the processor may provide an indication or notification of a successful notarization in block 520. In response to determining that the signature authentication has not passed (i.e., determination block 518="No"), the processor may provide an indication or notification of a failed notarization in block 522.

In some embodiments, when the notarization is successful, the processor may bind the signature and biometric or biometrics data with the document and a notarization certification in block 524. In some embodiments, the processor may forward the executed document, bound signature and biometric data, and notarization certification to a server, such as a notary server. A processor such as a server processor may store the documents and data or may provide the documents and data to the appropriate entity (e.g., bank, mortgage company, government office, law office, etc.) to verify that the document was signed and notarized, to provide a copy of the signed and notarized document, and so on.

Figure 6:
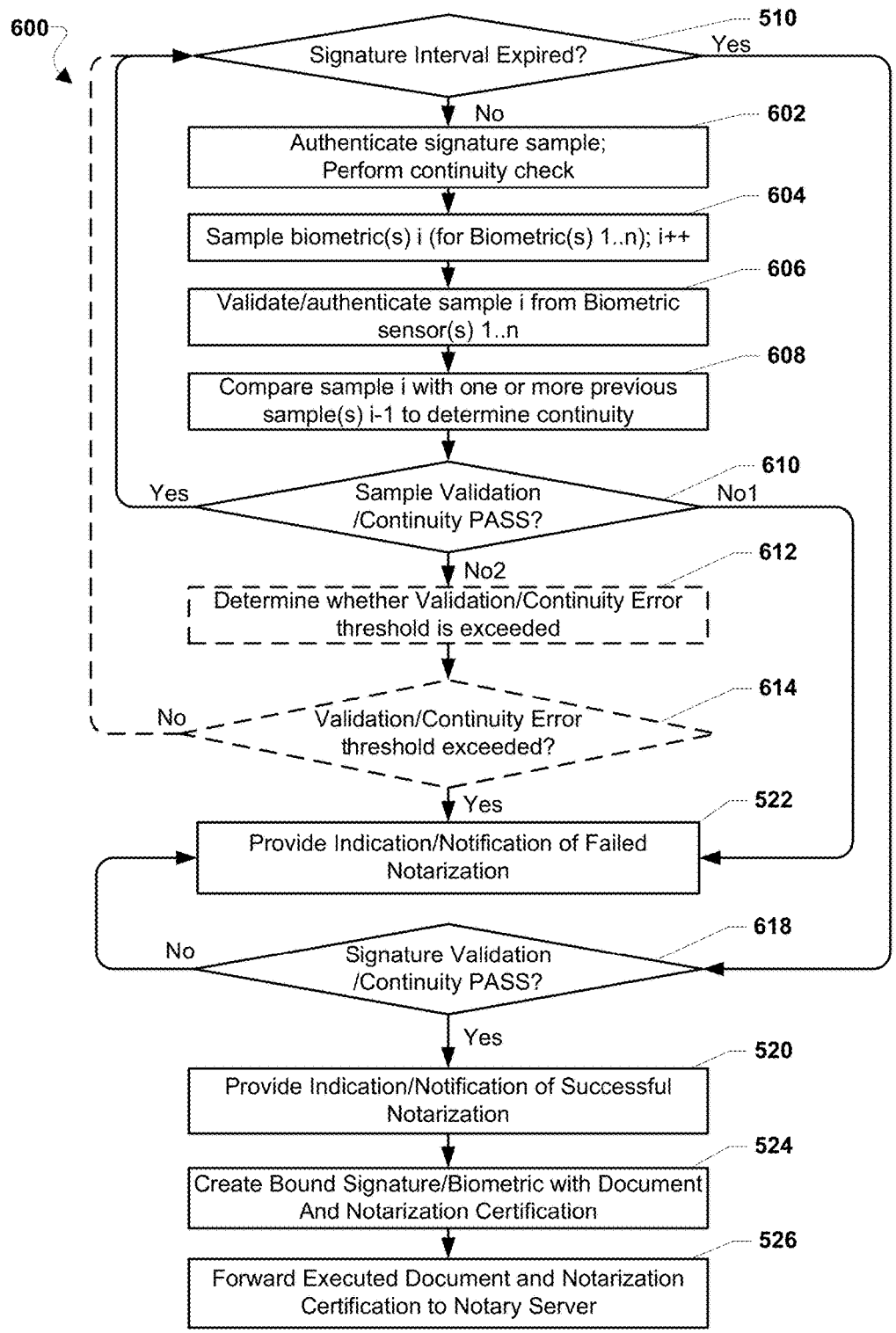
FIG. 6 is a process flow diagram illustrating a further embodiment method for simultaneously authenticating a signature and performing continuous biometric sampling.

A further embodiment method 600 for performing simultaneous signature making, verification, continuous sampling and verification of one or more biometrics is illustrated in FIG. 6. The embodiment method 600 may be understood with reference to FIG. 5 and block 512. During the signature interval, in determination block 510, the processor may determine whether the signature interval has expired. In response to determining that the signature interval has not expired (i.e., determination block 510="No"), the processor may authenticate and perform a continuity check on the current signature sample in block 602. In block 604, simultaneously with making, sampling and authenticating the signature, the processor may sample the next biometric or biometrics from one or more biometric sensors. In block 606, the processor may validate, authenticate or otherwise confirm the sample from the biometric sensor, or additional samples from one or more additional biometric samples. In block 608, the processor may check the continuity of the present sample or samples by comparing the present sample with one or more previous samples. For example, the biometric samples may be correlated to determine a degree of similarity.

A high degree of correlation between the present sample and the previous sample or samples, may indicate that the sample is continuous. A low degree of correlation between the present sample and the previous sample or samples, may indicate that the current sample is non-continuous and may raise a presumption that the current sample has been spoofed. In some instances of intrusion an unauthorized sample or series of samples of a biometric may be inserted in place of a stream that is being captured. Even though in such an example, the same biometric is being substituted, there may be sufficient differences between the current sampling conditions and the conditions that existed when the unauthorized samples were made to result in a low degree of correlation.

Therefore, in embodiments, continuity may be determined though information that is contained in the sample, such as a sequence number of the sample, a code or hash value associated with the sample, an identifier, a time-date stamp, or other identifying information. The identifying information may also include identifying information associated with a source of the samples, such as an identifier of the sampling unit. In other examples, the identifying information may be an established sampling format. For example, the continuity may be validated based on a condition between the first sample and the second sample. The condition may include a code condition between a code embedded or associated with the code embedded in a first sample compares favorably with a code embedded in or associated with the second sample. In some embodiments, a code may be generated at the time of sampling. In such an example, the favorable comparison of the relative code conditions may refer to the codes being the same. In some embodiments, an identifier of the source of the samples may be generated, such as a hardware or sampling unit identifier. In such embodiments, the favorable comparison of the relative sample source identifier condition between the first sample and the second sample may refer to the sample source identifiers being the same. Alternatively, or in addition, in some embodiments, the samples may be generated according to an established format. In such embodiments, the favorable comparison of the relative sample format condition between the first sample and the second sample may refer to the sample format being the same.

In a further embodiment, the condition may include a correlation condition between the second sample and the first sample. For example if the first sample and the second sample are highly uncorrelated, it may be inferred that an intrusion has occurred. In a further embodiment, the condition may include a sequence number condition between the first sample and the second sample. For example, if a sequence number of the second sample does not indicate a number that immediately follows the sequence number of the first samples, then an error condition may be assumed. In other embodiments combinations of the above described techniques may be used.

In block 610, the processor may determine whether the sample authentication and continuity checks have passed. In response to determining that the sample authentication and continuity checks have passed (i.e., determination block 610="Yes"), the processor may determine whether the signature interval has expired in block 510. In response to determining that the signature interval has not expired (i.e., determination block 510="No") the processor may repeat the operations in blocks 602, 604, 606, 608 and 610. In response to determining that the signature interval is expired (i.e., determination block 510=Yes"), the processor may determine whether the signature authentication and continuity check as passed in block 618. In response to determining that the sample authentication and continuity checks have not passed (i.e., determination block 610="No1"), the processor may provide an indication or notification of a failed notarization in block 522 and the notarization process, including the signature and biometric sampling may be terminated.

Alternatively, in response to determining that the sample authentication and continuity checks have not passed (i.e., determination block 610="No2"), the processor may optionally determine whether one or more of an error threshold associated with the authentication, and an error threshold associated with the continuity check is exceeded in block 612. It may be reasonable to expect that samples may be periodically corrupted during the signature interval. The corruption of samples may cause a sample to fail authentication, continuity check or both.

In response to determining that one or more of the authenticity and continuity error thresholds has been exceeded (i.e., determination block 614="Yes") the processor may provide an indication or notification of a failed notarization in block 522 and the notarization process, including the signature and biometric sampling may be terminated. In response to determining that both the authenticity and continuity error thresholds have not been exceeded (i.e., determination block 614="No") the processor may return to determination block 510, in which it may be determined whether the signature interval has expired. In response to determining that the signature interval has not expired (i.e., determination block 510="No") the processor may repeat the operations in blocks 602, 604, 606, 608 and 610 as described herein. In response to determining that the signature interval is expired (i.e., determination block 510=Yes"), the processor may determine whether the signature authentication and continuity check has passed in block 618. In response to determining that the signature authentication and continuity checks have passed (i.e., determination block 618="Yes"), the processor may provide an indication or notification of a successful notarization in block 520 and the processor may perform the operations of blocks 524 and 526 as previously described.

Figure 7:
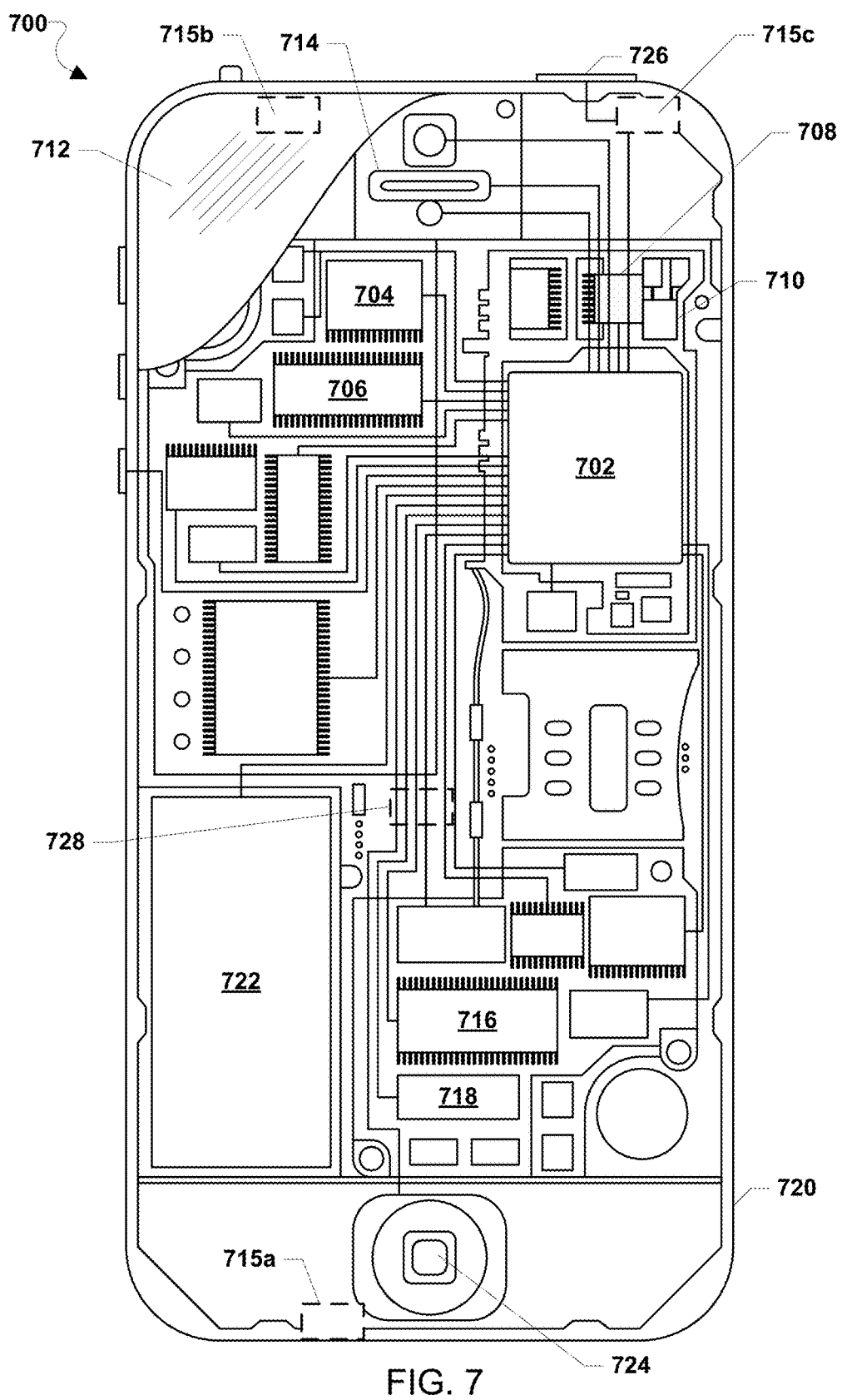
FIG. 7 is a component diagram of an example mobile computing device suitable for use with the various embodiments.

The various aspects may be implemented in any of a variety of mobile computing devices (e.g., smartphones, tablets, etc.) an example of which is illustrated in FIG. 7. The mobile computing device 700 may include a processor 702 coupled the various systems of the computing device 700 for communication with and control thereof. For example, the processor 702 may be coupled to a touch screen controller 704, radio communication elements, speakers and microphones, and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. In another embodiment (not shown), the computing device 700 may also be coupled to an external memory, such as an external hard drive.

The touch screen controller 704 and the processor 702 may also be coupled to a touch screen panel 712, such as a resistive-sensing touch screen, capacitive-sensing touch screen, infrared sensing touch screen, etc. Additionally, the display of the mobile computing device 700 need not have touch screen capability. The mobile computing device 700 may have one or more radio signal transceivers 708 (e.g., Peanut, Bluetooth, Bluetooth LE, Zigbee, Wi-Fi, RF radio, etc.) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

In some embodiments, the mobile computing device 700 may include microphones 715. For example, the mobile computing device may have a conventional microphone 715a for receiving voice or other audio frequency energy from a user during a call. The mobile computing device 700 may further be configured with additional microphones 715b and 715c, which may be configured to receive audio including ultrasound signals. Alternatively, all microphones 715a, 715b, and 715c may be configured to receive ultrasound signals. The microphones 715 may be piezo-electric transducers, or other conventional microphone elements. Because more than one microphone 715 may be used, relative location information may be received in connection with a received ultrasound signal through various triangulation methods. At least two microphones 715 configured to receive ultrasound signals may be used to generate position information for an emitter of ultrasound energy.

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

In some embodiments, the mobile computing device 700 may further include an accelerometer 728, which senses movement, vibration, and other aspects of the device through the ability to detect multi-directional values of and changes in acceleration. In the various embodiments, the accelerometer 728 may be used to determine the x, y, and z positions of the mobile computing device 700. Using the information from the accelerometer, a pointing direction of the mobile computing device 700 may be detected.

Figure 8:
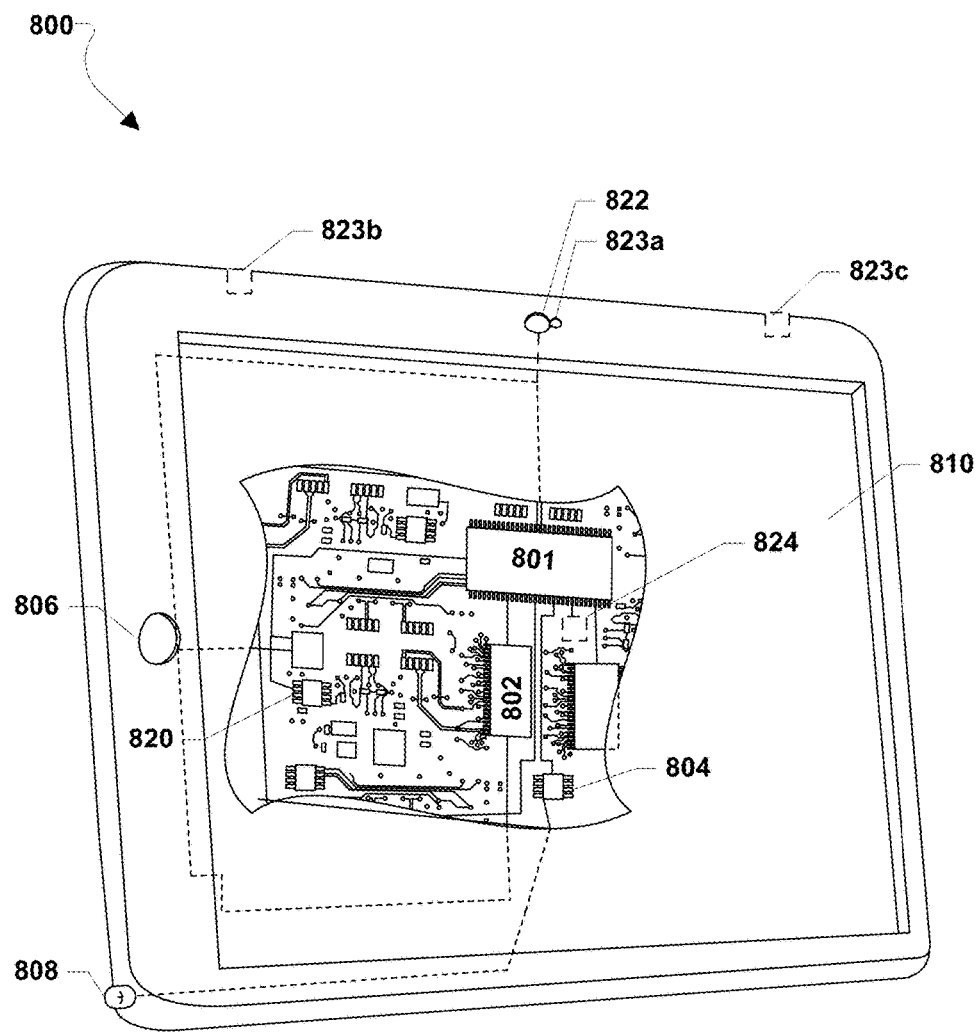
FIG. 8 is a component diagram of an example mobile computing device suitable for use with the various embodiments.

The various embodiments may be implemented in any of a variety of tablet mobile computing devices, an example of which is illustrated in FIG. 8. For example, a tablet mobile computing device 800 may include a processor 801 coupled to internal memory 802. The internal memory 802 may be volatile or non-volatile memory, and may also be secure and/or encrypted memory, or unsecure and/or unencrypted memory, or any combination thereof. The processor 801 may also be coupled to a touch screen display 810, such as a resistive-sensing touch screen, capacitive-sensing touch screen infrared sensing touch screen, etc. The tablet mobile computing device 800 may have one or more radio signal transceivers 804 (e.g., Peanut, Bluetooth, Zigbee, WiFi, RF radio) and antennas 808 for sending and receiving wireless signals as described herein. The transceivers 804 and antennas 808 may be used with the above-mentioned circuitry to implement the various wireless transmission protocol stacks and interfaces. The tablet mobile computing device 800 may include a cellular network wireless modem chip 820 that enables communication via a cellular network. The tablet mobile computing device 800 may also include a physical button 806 for receiving user inputs. The tablet mobile computing device 800 may also include various sensors coupled to the processor 801, such as a camera 822, a microphone or microphones 823, and an accelerometer 824.

For example, the tablet mobile computing device 800 may have a conventional microphone 823a for receiving voice or other audio frequency energy from a user during a call or other voice frequency activity. The tablet mobile computing device 800 may further be configured with additional microphones 823b and 823c, which may be configured to receive audio including ultrasound signals. Alternatively, all microphones 823a, 823b, and 823c may be configured to receive ultrasound signals. The microphones 823 may be piezo-electric transducers, or other conventional microphone elements. Because more than one microphone 823 may be used, relative location information may be received in connection with a received ultrasound signal through various methods such as time of flight measurement, triangulation, and similar methods. At least two microphones 823 that are configured to receive ultrasound signals may be used to generate position information for an emitter of ultrasound energy.

Also in some embodiments, the tablet mobile computing device 800 may further include the accelerometer 824 which senses movement, vibration, and other aspects of the tablet mobile computing device 800 through the ability to detect multi-directional values of and changes in acceleration. In the various embodiments, the accelerometer 824 may be used to determine the x, y, and z positions of the tablet mobile computing device 800. Using the information from the accelerometer 824, a pointing direction of the tablet mobile computing device 800 may be detected.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for authenticating a signature made by a signer, comprising:
    generating a sequence of biometric samples of a biometric quantity by continuously sampling the biometric quantity associated with the signer in successive sampling intervals while the signer is making the signature, wherein each biometric sample includes identifying information associated with a source or format of the biometric sample;
    validating a continuity of the generated sequence of biometric samples, wherein validating the continuity of the generated sequence of biometric samples comprises:
        comparing the identifying information associated with the source or format of each biometric sample in the generated sequence to the identifying information of a previous biometric sample in the generated sequence;
        determining, based on the comparison of the identifying information associated with the source or format of each biometric sample, whether a condition indicating an interruption in the source or format of the generated sequence of biometric samples is detected during one or more of the successive sampling intervals; and
        validating the continuity of the generated sequence of biometric sample in response to determining that no condition indicating an interruption in the source or format of the generated sequence of biometric samples is detected;
    validating that each biometric sample in the generated sequence of biometric samples corresponds to the signer; and
    authenticating the signature of the signer in response to determining that each biometric sample in the generated sequence of biometric samples is validated and that the continuity of the sequence of biometric samples is validated.

2. The method of claim 1, further comprising not authenticating the signature of the signer when at least one of the following occurs:
    one or more biometric samples in the generated sequence of biometric samples is not validated; and
    continuity of the sequence of biometric samples is not validated.

3. The method of claim 1, further comprising validating the signature made by the signer while the signer is making the signature by:
   continuously sampling the signature while the signer is making the signature to generate a sequence of signature samples; and
   validating the generated sequence of signature samples generated during the sampling of the signature.

4. The method of claim 1, wherein generating the sequence of biometric samples of the biometric quantity by continuously sampling the biometric quantity associated with the signer comprises taking a first biometric sample during a first sampling interval to generate a first one of the sequence of biometric samples and taking a second biometric sample during a second sampling interval immediately following the first sampling interval to generate a second one of the sequence of biometric samples.

5. The method of claim 1, wherein validating the continuity of the generated sequence of biometric samples of the biometric quantity further comprises:
   not validating the continuity of the generated sequence of biometric samples in response to determining that no condition indicating an interruption in the source or format of the generated sequence of biometric samples is detected.

6. The method of claim 1,
   wherein the condition indicating an interruption includes at least one of a sequence number condition or a code condition.

7. The method of claim 1, further comprising detecting when the signer is making the signature by detecting movement of one of:
   an ink pen;
   an electronic pen;
   a physical implement;
   a body part; or
   a fingertip on a touch sensitive surface.

8. A system for authenticating a signature made by a signer, comprising:
   a biometric sensor; and
   a processor coupled to the biometric sensor, the processor configured with processor readable instructions for performing operations comprising:
      generating a sequence of biometric samples of a biometric quantity by continuously sampling the biometric sensor for the biometric quantity associated with the signer in successive sampling intervals while the signer is making the signature, wherein each biometric sample includes identifying information associated with a source or format of the biometric sample;
      validating a continuity of the generated sequence of biometric samples of the biometric quantity, wherein validating the continuity of the generated sequence of biometric samples comprises:
         comparing the identifying information associated with the source or format of each biometric sample in the generated sequence to the identifying information of a previous biometric sample in the generated sequence;
         determining, based on the comparison of the identifying information associated with the source or format of each biometric sample, whether a condition indicating an interruption in the source or format of the generated sequence of biometric samples is detected during one or more of the successive sampling intervals; and
      validating the continuity of the generated sequence of biometric sample in response to determining that no condition indicating an interruption in the source or format of the generated sequence of biometric samples is detected;
      validating that each biometric sample in the generated sequence of biometric samples of the biometric quantity corresponds to the signer; and
      authenticating the signature of the signer in response to determining that each biometric sample in the generated sequence of biometric samples is validated, and the continuity of the sequence of biometric samples is validated.

9. The system of claim 8, wherein the processor is configured with instructions for performing operations further comprising not authenticating the signature of the signer when at least one of the following occurs:
   one or more biometric samples in the generated sequence of biometric samples is not validated; and
   continuity of the sequence of biometric samples is not validated.

10. The system of claim 8, further comprising a signature sensor coupled to the processor, wherein the processor is configured with instructions for performing operations comprising validating the signature made by the signer while the signer is making the signature by:
    continuously sampling the signature sensor while the signer is making the signature to generate a sequence of signature samples; and
    validating the generated sequence of signature samples generated during the sampling of the signature sensor for the signature.

11. The system of claim 8, wherein the processor is configured with instructions for performing operations such that generating the sequence of biometric samples of a biometric quantity by continuously sampling the biometric sensor for the biometric quantity associated with the signer comprises taking a first biometric sample from the biometric sensor during a first sampling interval to generate a first one of the sequence of biometric samples and taking a second biometric sample from the biometric sensor during a second sampling interval immediately following the first sampling interval to generate a second one of the sequence of biometric samples.

12. The system of claim 8, wherein the processor is configured with instructions for performing operations such that validating the continuity of the generated sequence of biometric samples of the biometric quantity further comprises:
    not validating the continuity of the generated sequence of biometric samples in response to determining that no condition indicating an interruption in the source or format the generated sequence of biometric samples is detected.

13. The system of claim 8,
    wherein the condition indicating an interruption includes at least one of a sequence number condition or a code condition.

14. The system of claim 8, wherein the processor is configured with instructions for performing operations comprising detecting that the signer is the making the signature by detecting movement of one of:
    an ink pen;
    an electronic pen;
    a physical implement;
    a body part; or
    a fingertip on a touch sensitive surface.

15. A system for authenticating a signature made by a signer, comprising:
- a biometric sensor;
- means for generating a sequence of biometric samples of a biometric quantity by continuously sampling the biometric sensor for the biometric quantity associated with the signer in successive sampling intervals while the signer is making the signature, wherein each biometric sample includes identifying information associated with a source or format of the biometric sample;
- means for validating a continuity of the generated sequence of biometric samples of the biometric quantity, wherein means for validating the continuity of the generated sequence of biometric samples comprises:
  - means for comparing the identifying information associated with the source or format of each biometric sample in the generated sequence to the identifying information of a previous biometric sample in the generated sequence;
  - means for determining, based on the comparison of the identifying information associated with the source or format of each biometric sample, whether a condition indicating an interruption in the source or format of the generated sequence of biometric samples is detected during one or more of the successive sampling intervals; and
  - means for validating the continuity of the generated sequence of biometric sample in response to determining that no condition indicating an interruption in the source or format of the generated sequence of biometric samples is detected;
- means for validating that each biometric sample in the generated sequence of biometric samples of the biometric quantity corresponds to the signer; and
- means for authenticating the signature of the signer in response to determining that each biometric sample in the generated sequence of biometric samples is validated, and the continuity of the sequence of biometric samples is validated.

16. The system of claim 15, wherein means for authenticating does not authenticate the signature of the signer when at least one of the following occurs:
- one or more biometric samples in the generated sequence of biometric samples is not validated; and
- continuity of the sequence of biometric samples is not validated.

17. The system of claim 15, further comprising means for validating the signature made by the signer while the signer is making the signature, and signature sensor means for sensing a signature, wherein means for validating the signature made by the signer while the signer is making the signature comprises:
- means for continuously sampling the signature sensor means while the signer is making the signature to generate a sequence of signature samples; and
- means for validating the generated sequence of signature samples generated.

18. The system of claim 15, wherein means for generating the sequence of biometric samples of the biometric quantity by continuously sampling the biometric sensor for the biometric quantity associated with the signer comprises:
- means for taking a first biometric sample from the biometric sensor during a first sampling interval to generate a first one of the sequence of biometric samples and for taking a second biometric sample from the biometric sensor during a second sampling interval immediately following the first sampling interval to generate a second one of the sequence of biometric samples.

19. The system of claim 15, wherein means for validating the continuity of the generated sequence of biometric samples of the biometric quantity further comprises:
- means for not validating the continuity of the generated sequence of biometric in response to determining that no condition indicating an interruption in the source or format of the generated sequence of biometric samples is detected.

20. The system of claim 15, wherein the condition indicating an interruption includes at least one of a sequence number condition or a code condition.

21. The system of claim 15, further comprising means for detecting that the signer is making the signature comprising means for detecting movement of one of:
- an ink pen;
- an electronic pen;
- a physical implement;
- a body part; or
- a fingertip on a touch sensitive surface.

22. A non-transitory computer readable medium having stored thereon processor-executable instructions configured to cause a processor to perform operations for authenticating a signature made by a signer comprising:
- generating a sequence of biometric samples of a biometric quantity by continuously sampling a biometric sensor for the biometric quantity associated with the signer in successive intervals while the signer is making the signature, wherein each biometric sample includes identifying information associated with a source or format of the biometric sample;
- validating a continuity of the generated sequence of biometric samples of the biometric quantity, wherein validating the continuity of the generated sequence of biometric samples comprises:
  - comparing the identifying information associated with the source or format of each biometric sample in the generated sequence to the identifying information of a previous biometric sample in the generated sequence;
  - determining, based on the comparison of the identifying information associated with the source or format of each biometric sample, whether a condition indicating an interruption in the source or format of the generated sequence of biometric samples is detected during one or more of the successive sampling intervals; and
  - validating the continuity of the generated sequence of biometric sample in response to determining that no condition indicating an interruption in the source or format of the generated sequence of biometric samples is detected;
- validating that each biometric sample in the generated sequence of biometric samples of the biometric quantity corresponds to the signer; and
- authenticating the signature of the signer in response to determining that each biometric sample in the generated sequence of biometric samples is validated, and the continuity of the sequence of biometric samples is validated.

23. The non-transitory computer readable medium of claim 22, wherein the stored instructions are configured to cause the processor to perform operations further comprising not authenticating the signature of the signer when at least one of the following occurs:

one or more biometric samples in the generated sequence of biometric samples is not validated; and continuity of the sequence of biometric samples is not validated.

24. The non-transitory computer readable medium of claim 22, wherein the stored instructions are configured to cause the processor to perform operations comprising validating the signature made by the signer while the signer is making the signature by:

continuously sampling a signature sensor while the signer is making the signature to generate a sequence of signature samples; and validating the generated sequence of signature samples generated during the sampling of the signature sensor for the signature.

25. The non-transitory computer readable medium of claim 22, wherein the stored instructions are configured to cause the processor to perform operations such that generating the sequence of biometric samples of the biometric quantity by continuously sampling the biometric sensor for the biometric quantity associated with the signer comprises taking a first biometric sample from the biometric sensor during a first sampling interval to generate a first one of the sequence of biometric samples and taking a second biometric sample from the biometric sensor during a second sampling interval immediately following the first sampling interval to generate a second one of the sequence of biometric samples.

26. The non-transitory computer readable medium of claim 22, wherein the stored instructions are configured to cause the processor to perform operations such that validating the continuity of the generated sequence of biometric samples of the biometric quantity further comprises:

not validating the continuity of the generated sequence of biometric samples in response to determining that no condition indicating an interruption in the source or format of the generated sequence of biometric samples is detected.

27. The non-transitory computer readable medium of claim 22, wherein the condition indicating an interruption includes at least one of a sequence number condition or a code condition.

28. The non-transitory computer readable medium of claim 22, wherein the stored instructions are configured to cause the processor to perform operations comprising detecting that the signer is making the signature by detecting movement of one of:

an ink pen;

an electronic pen;

a physical implement;

a body part; or a fingertip on a touch sensitive surface.

* * * * *